(12) United States Patent
Noda et al.

(10) Patent No.: US 6,460,261 B1
(45) Date of Patent: Oct. 8, 2002

(54) V-GROOVE SHAPE MEASURING METHOD AND APPARATUS BY USING ROTARY TABLE

(75) Inventors: Takashi Noda, Utsunomiya (JP); Hiromi Deguchi, Utsunomiya (JP); Katsuyuki Ogura, Utsunomiya (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 09/713,217

(22) Filed: Nov. 16, 2000

(30) Foreign Application Priority Data

Nov. 18, 1999 (JP) .......................... 11-328365
Mar. 17, 2000 (JP) ........................ 2000-075034

(51) Int. Cl.[7] .............................................. G01B 5/004
(52) U.S. Cl. ...................................... 33/503; 33/199 R
(58) Field of Search .......................... 33/501.7, 501.11, 33/501.14, 501.15, 199 R, 199 B, 503

(56) References Cited

U.S. PATENT DOCUMENTS

| 1,656,314 | A | * | 1/1928 | Buckingham | 33/199 B |
| 2,806,294 | A | * | 9/1957 | Cargill | 33/199 R |
| 3,796,493 | A | * | 3/1974 | Yamamoto et al. | 33/199 B |
| 4,672,750 | A | * | 6/1987 | Storace et al. | 33/199 R |
| 4,761,891 | A | * | 8/1988 | Sugimura | 33/503 |
| 4,769,763 | A | * | 9/1988 | Trieb et al. | 33/503 |
| 5,020,229 | A | * | 6/1991 | Schwartz et al. | 33/199 R |
| 5,204,824 | A | | 4/1993 | Fujimaki | |
| 5,251,154 | A | * | 10/1993 | Matsumoto et al. | 33/199 R |
| 6,044,569 | A | * | 4/2000 | Ogihara et al. | 33/503 |

FOREIGN PATENT DOCUMENTS

| DE | 3929760 A1 | * | 5/1990 | 33/199 R |
| DE | 4027339 A1 | | 3/1991 | |
| GB | 2237661 A | | 8/1991 | |
| JP | 55113907 A | * | 9/1980 | 33/199 R |
| JP | 56110003 A | * | 9/1981 | 33/199 R |
| JP | 06-341826 | | 12/1994 | |

OTHER PUBLICATIONS

U.S. patent application Publication 20010034948–A1 to Matsumiya et al, Nov. 1, 2001, (33/503).*

* cited by examiner

Primary Examiner—Diego Gutierrez
Assistant Examiner—Mirellys Jagan
(74) Attorney, Agent, or Firm—Oliff & Berridge, PLC

(57) ABSTRACT

By combining measuring element direction constant control, rotary table radius constant scanning control, and two-flank contact control, V-groove rotary table scanning control is performed to cause the measuring element of the scanning probe to contact always with two flanks composing the V-groove of the object to be measured, so that it is possible to measure accurately the characteristic values such as pitch deviation and axial runout of side face of male threads set up and fixed on a rotary table or screw hole of the object put on the rotary table.

21 Claims, 20 Drawing Sheets

PRIOR ART

PRIOR ART

FIG.21
ONE-FLANK CONTACT
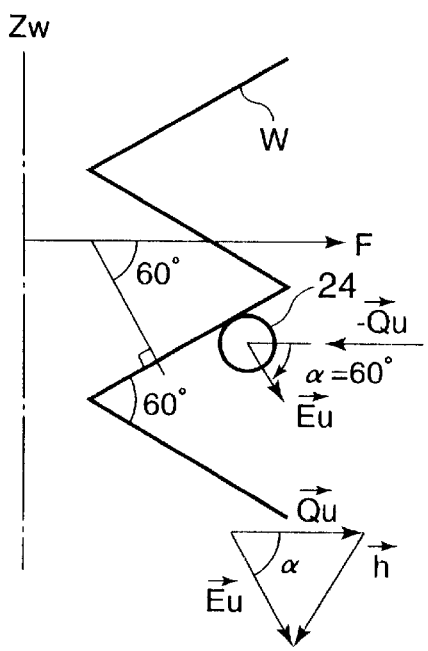
TWO-FLANK CONTACT
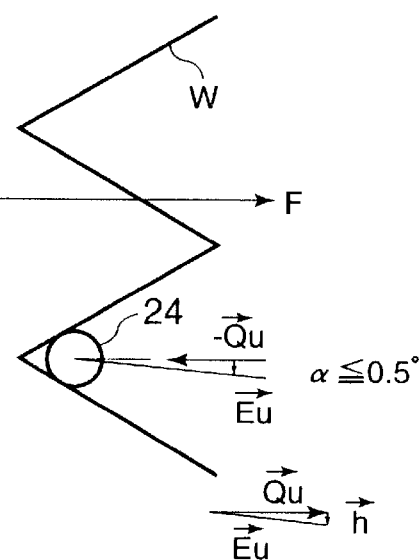

V-GROOVE SHAPE MEASURING METHOD AND APPARATUS BY USING ROTARY TABLE

BACKGROUND OF THE INVENTION

1. Field of the Invention

The present invention relates to a V-groove shape measuring method and apparatus, and more particularly to a V-groove shape measuring method and apparatus preferably used for measuring characteristic values such as pitch deviation or axial runout of side face of V-grooves of the work to be measured spirally forming V-grooves for worm gear, male threads, screw holes, and the like, by using a three-dimensional coordinate measuring machine.

2. Description of the Related Art Including Information Disclosed Under 37 CFR 1.97 and 1.98

As an instrument for measuring a solid figure of a work or other object to be measured at high precision, a three-dimensional coordinate measuring machine (or three-dimensional measuring machine) 10 as shown in FIG. 1 has been known. It comprises a platen 12 with a smooth and flat polished surface made of, for example, granite, a portal frame 14 installed to be movable in the longitudinal direction (for example, Y-axis direction) of the platen 12, a slider 16 installed to be movable in the lateral direction (for example, X-axis. direction) along a horizontal beam 15 of the portal frame 14, an elevating shaft 18 installed on this slider 16 to be movable in the vertical direction (for example, z-axis direction), and a probe 22 for measuring coordinates, being provided at the lower end of this elevating shaft 18 through a probe holder 20, and having a measuring element 24 formed at the leading end thereof.

Therefore, after putting a work W to be measured on the platen 12, the probe 22 is moved in three directions (X-, Y-, Z-axis directions) to cause the measuring element 24 to contact with measuring positions of the work W, and at each contact point, sequentially, the coordinate values in each axial direction of the probe 22 are read from a scale not shown, and these coordinate values are calculated, so that the dimensions and angle of the work W can be measured at high precision.

As a method of measuring 1 the screw shape by using such three-dimensional measuring machine, the present applicant proposed a method of determining the center coordinates of screw hole in, for example, Japanese Laid-open Patent No.Hei 6(1994)-341826.

When measuring the work shape by using such three-dimensional measuring machine, it is required to scan and measure the work coordinates sequentially while moving the probe 22 for measuring the coordinates. As an automatic method for this scanning control by using a computer, without using a rotary table, a control method of scanning along the contour of the work while keeping constant the height from a reference plane by using an arbitrary plane as a reference plane (hereinafter called height constant scanning control), and a control method, shown in FIG. 3 in case of using a rotary table 30, of scanning along the contour of the work W within a cylindrical plane determined by specification of an arbitrary straight line and the distance (that is, the radius) from the straight line (hereinafter called radius constant scanning control).

Further, as shown in FIG. 2, with using the rotary table 30, the applicant proposed U.S. Pat. No. 5,204,824 (corresponding to UK 2237661, DE4027339A1), in which one axis by rotary table is added to a three-axis scanning control without using a rotary table, scanning by a four-axis simultaneous control is realized while keeping constant the direction of the probe with respect to the measurement reference line of the work (called measuring element direction constant scanning control).

According to this method, when not using the rotary table, as in the case of the cylindrical cam shown in FIG. 3, if it is impossible to measure by one operation due to interference of the work and the probe, it is possible to measure the whole circumference by one operation without changing the position (direction) of the probe. Besides, even in the case of impeller or propeller blades that cannot be measured by one operation, the number of times of changing the position of the probe can be decreased.

Recently, on the other hand, as the objects of measurement are diversified, there are increasing demands for measuring a deviation (for example, maximum deviation) of thread pitch P of worm gear forming spiral V-grooves, general male threads, or screw holes formed in works as shown in FIG. 5, or the deviation (for example, maximum deviation $\Delta R$) in the radius R direction of the plane locus of threads superposed in the axial direction as shown in FIG. 6, but they could not be measured accurately in the conventional methods.

BRIEF SUMMARY OF THE INVENTION

The invention is devised to solve the problems of the prior arts, and it is hence an object thereof to measure the characteristic values of V-groove shape accurately, such as worm gears, general male threads, and screw holes.

The invention is for scanning and measuring a V-groove by using a scanning probe for measuring the position, while rotating a work by a rotary table, with the work having a spiral V-groove fixed on the rotary table, by combining:

a measuring element direction constant control aiming at keeping constant a vector projected on the table plane of the rotary table of a direction vector from the origin of the work to a measuring element of the scanning probe as seen from a machine coordinate system, a rotary table radius constant scanning control of which confinement plane is a cylindrical plane, and a two-flank contact scanning control for causing the measuring element to contact with two flanks for composing the V-groove, wherein a V-groove rotary table scanning control and a measurement are performed while keeping the measuring element always in contact with the two flanks for composing the V-groove, thereby solving the problems.

The V-groove rotary table scanning control may be realized by:

sampling a position vector X of the scanning probe (hereinafter all vector symbols are omitted to avoid complication of description of the specification), its displacement amount $\Delta X$, and rotational angle $\theta$ of the rotary table, calculating an approach reverse direction vector Qu in a direction vertical to the axial center V of the object from the rotational angle $\theta$ of the rotary table, calculating the speed vector V of the probe while the rotary table is stopped at the rotational angle $\theta$, calculating the angular velocity $\omega W$ of the rotary table by speed vector V of the probe as seen from the axial center of the work, adjusting the advance or retardation from a target value of the rotational angle $\theta$ of the table due to control error from the configuration of the table rotational angle θ and the probe position X, determining a correction angular velocity Δω, and correcting the angular velocity ωw from this Δω, calculating a speed vector Vt following up the movement of the correction angular velocity Δω at the probe position X and the table rotational angle θ, and calculating a vector sum Vf(=V+Vt) of the follow-up speed vector Vt and probe speed vector V to obtain a probe speed command, and correcting the angular velocity ωw by the correction angular velocity Δω to obtain a value ωt(=ωw+Δω) as a speed command of the rotary table.

The speed vector V of the probe may be the sum of the basic speed vector Vo showing the basic running direction of the scanning probe, a displacement correction vector Ve for keeping constant the displacement of the scanning probe, and a two-flank contact vector Vh for causing the measuring element to contact with two flanks of the V-groove.

Further, the radius correction vector Vr for keeping the radius constant may be added to the sum to obtain the speed vector V of the probe.

It may be regarded as an error when two-flank contact is not maintained during two-flank contact scanning control, so that a wrong measurement may not persist.

It may be judged that the two-flank contact is not maintained when an angle α formed by a vector Es projecting a probe normal vector Eu on the plane formed by the approach reverse direction vector Qu in the reverse direction of the approach direction to the work of the scanning probe and the vector gθ corresponding to the axial center of the work, and the approach reverse direction vector Qu becomes larger than a specified value.

It may be designed to obtain a two-flank contact securely before start of measurement by conducting approach process for causing the measuring element of the scanning probe to contact with the two flanks for composing the V-groove of the work before starting V-groove rotary table scanning control.

The approach process may be conducted by moving the work and the scanning probe relatively by the relative speed vector V obtained by the sum of a displacement correction vector Ve for keeping constant the displacement of the scanning probe, and a two-flank contact vector Vh for causing the measuring element to contact with the two flanks of the V-groove, and stopping the probe by judging that the two flanks are brought into contact when the angle α formed by the vector Es projecting the probe normal vector Eu on the plane formed by an approach reverse direction vector Qu in the reverse direction of the approach direction to the work of the scanning probe and the vector gθ corresponding to the axial center of the work, and the approach reverse direction vector Qu becomes within a specified value.

Further, processing in the approach direction of the scanning probe in the approach process and processing in the approach direction of the scanning probe in the approach process in the V-groove rotary table scanning control may be common, thereby starting the rotational angle θ of the rotary table from other than reference θ=0° can be permitted.

Further, when approaching from a direction of a certain axis of the machine coordinate system, other axes may be clamped, and effects of friction may be eliminated.

Further, the measurement may be conducted when the central axis of the work and the central axis of the rotary table are not matched with the specified range.

It may be judged that the central axis of the work and the central axis of the rotary table are matched when the distance from the origin of the work coordinate system having the central axis of the work as the third axis to the central axis of the rotary table, and the angle formed by the vector obtained by projecting the third axis of the work coordinate system on the plane including both origin of the work coordinate system and the central axis of the rotary table and the central axis of the rotary table, both settle within the specified allowable range respectively, and judged that the central axis of the work and the central axis of the rotary table are not matched otherwise.

In the invention, fixing the work forming a spiral V-groove on the rotary table, if the central axis of the work and the central axis of the rotary table are matched within the specified allowable range, in the case of scanning measurement of the V-groove by using the scanning probe for measuring the position while rotating the rotary table, by combining:

two-flank scanning control for causing the measuring element of the scanning probe to contact with the two flanks for composing the V-groove, and the pitch scanning control for moving the measuring element in the central axis direction at a speed determined on the basis of the pitch of the V-groove and the rotating speed of the rotary table, the V-groove rotary table scanning control for measuring while keeping the measuring element always in contact with the two flanks for composing the V-groove is executed, thereby solving the problems.

The V-groove rotary table scanning control is executed by:

sampling the position vector V of the scanning probe, its displacement ΔX, and rotational angle θ of the rotary table, calculating ω so that the composite speed of a peripheral speed Vω(=rω) produced on the basis of the distance r from the central axis of the rotary table to the position vector X, and a speed vector Vz(=GP(2π/ω)) in the central axis direction of the rotary table produced on the basis of a specified screw pitch GP when the rotary table is rotated at the angular velocity ω may be the specified scanning speed V, calculating a speed vector Vz on the basis of this ω value and screw pitch GP, and a setting the speed vector Vz as a speed vector command Vt to the scanning probe, and this ω value as the rotational speed command of the rotary table.

The speed vector command Vt of the probe may be the sum of the speed vector Vz, and a displacement correction vector Ve for keeping constant the displacement of the scanning probe.

The invention solves the problem by presenting the V-groove shape measuring apparatus which comprises a rotary table fixing a work forming a spiral V-groove, a scanning probe having a measuring element engaged with the surface of the work, a drive mechanism for moving the scanning probe along the surface of the work, position detecting means for detecting the position of the scanning probe, and control means for controlling the moving speed of the scanning probe and rotating speed of the rotary table so that the measuring element may always contact with the two flanks for composing the V-groove, by any one of the methods described above.

Plural measuring elements differing in diameter may be disposed parallel to the scanning probe, so as to be selected according to the size of the V-groove, and therefore it is easy to cope with changes of screw shape.

The rotary table may be assembled into a three-dimensional measuring machine, and its coordinate measuring probe is used as the scanning probe, so that the shape of the V-groove can be measured by the three-dimensional measuring machine.

By drilling a hole in the center of rotation of the rotary table or in the platen of the three-dimensional measuring machine immediately beneath it, the lower end of a long work is received, so that the measuring range of the three-dimensional measuring machine may not be limited by the rotary table or the parts not required to be measured beneath the work.

According to the invention, the pitch, axial runout and so on of side face of the V-groove of the work formed in a spiral profile can be measured accurately.

BRIEF DESCRIPTION OF THE SEVERAL VIEWS OF THE DRAWINGS

The preferred embodiments will be described with reference to the drawings, wherein like embodiments have been denoted throughout the figures with the like reference numerals, and wherein:

FIG. 21 is an essential front view for explaining the judging method of two-flank contact;

DETAILED DESCRIPTION OF THE INVENTION

Figure 1:
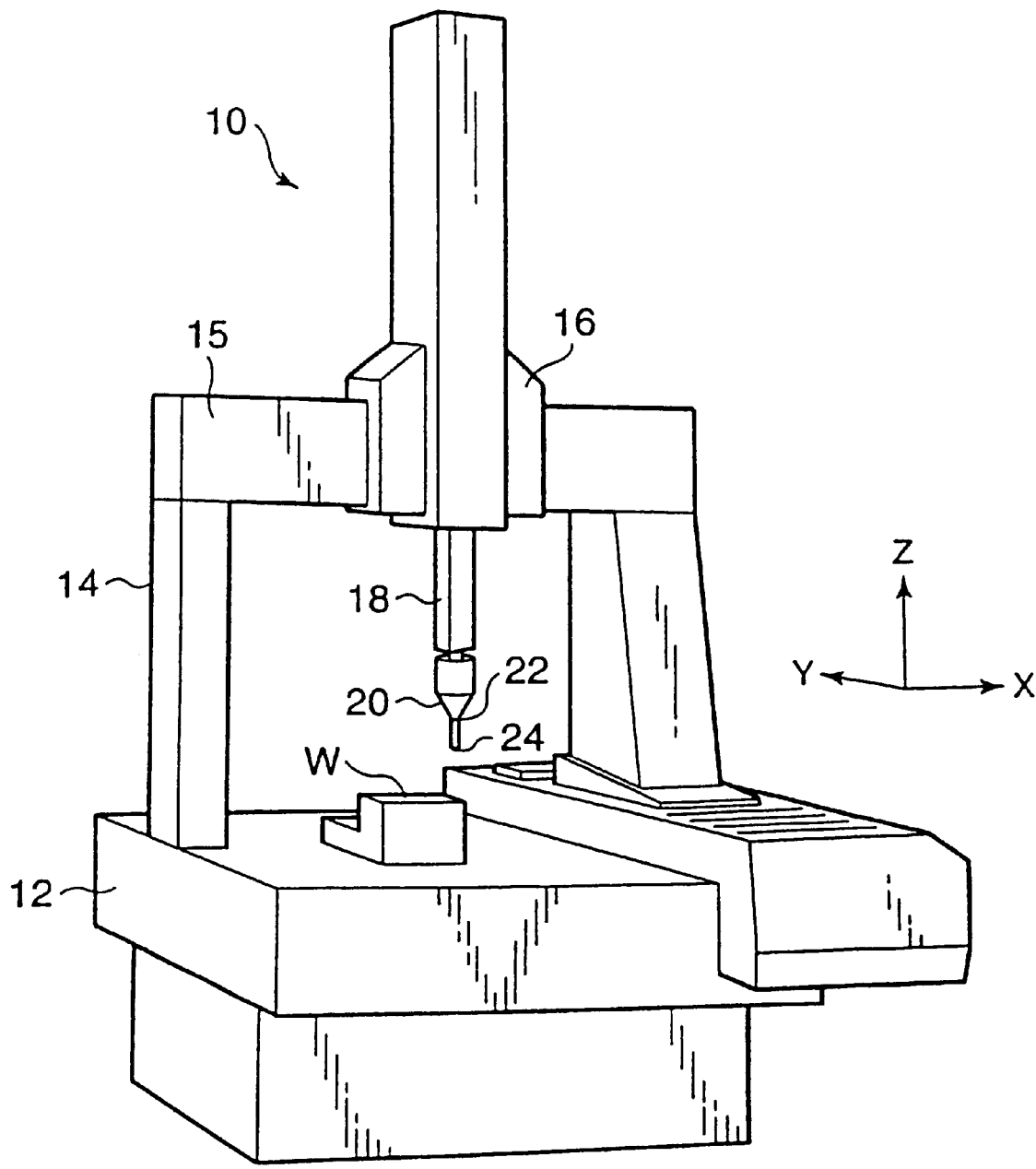
FIG. 1 is a perspective view showing a general structure of a three-dimensional measuring machine.
Figure 2:
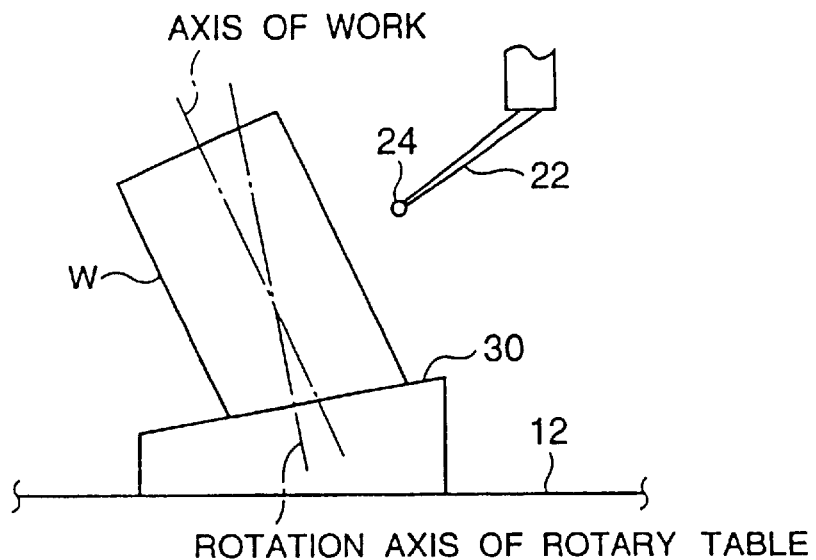
FIG. 2 is a front view showing a measuring state of surface properties of work by putting a rotary table on a platen of the three-dimensional measuring machine.
Figure 3:
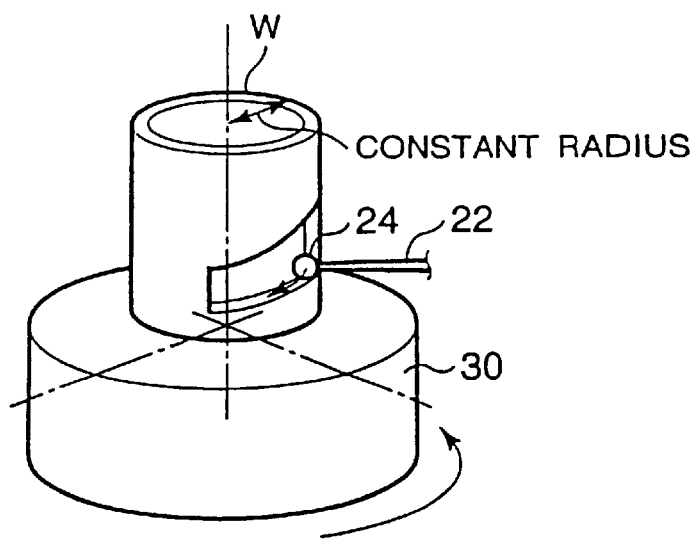
FIG. 3 is a perspective view showing a mode of rotary table radius constant scanning control of the same.
Figure 4:
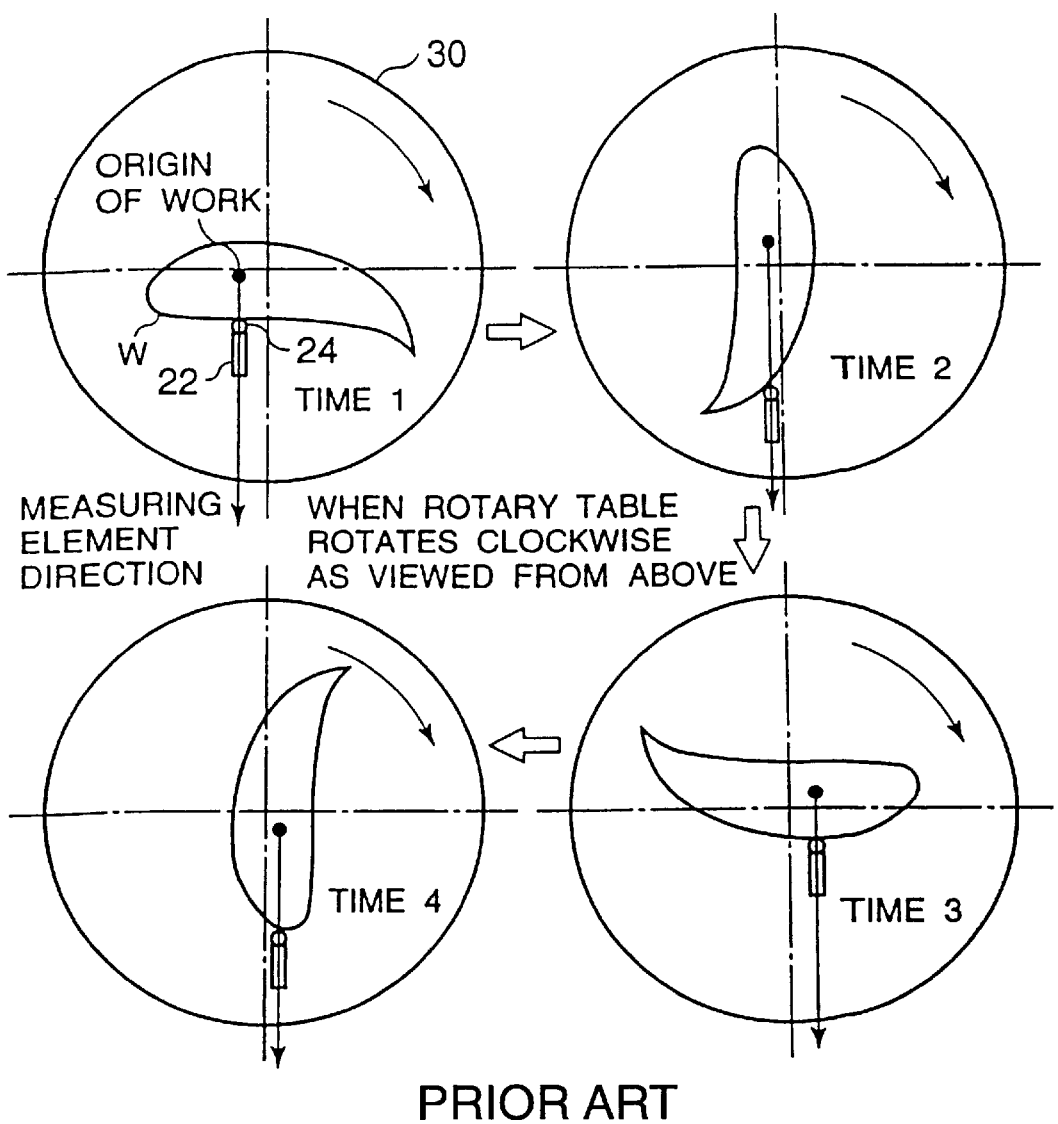
FIG. 4 is a plan showing a mode of measuring element direction constant control with using a rotary table as proposed by the present applicant in U.S. Pat. No. 5,204,824.
Figure 5:
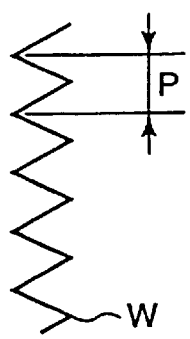
FIG. 5 is a front view showing the pitch of V-groove as one of objects of measurement in the invention.
Figure 6:
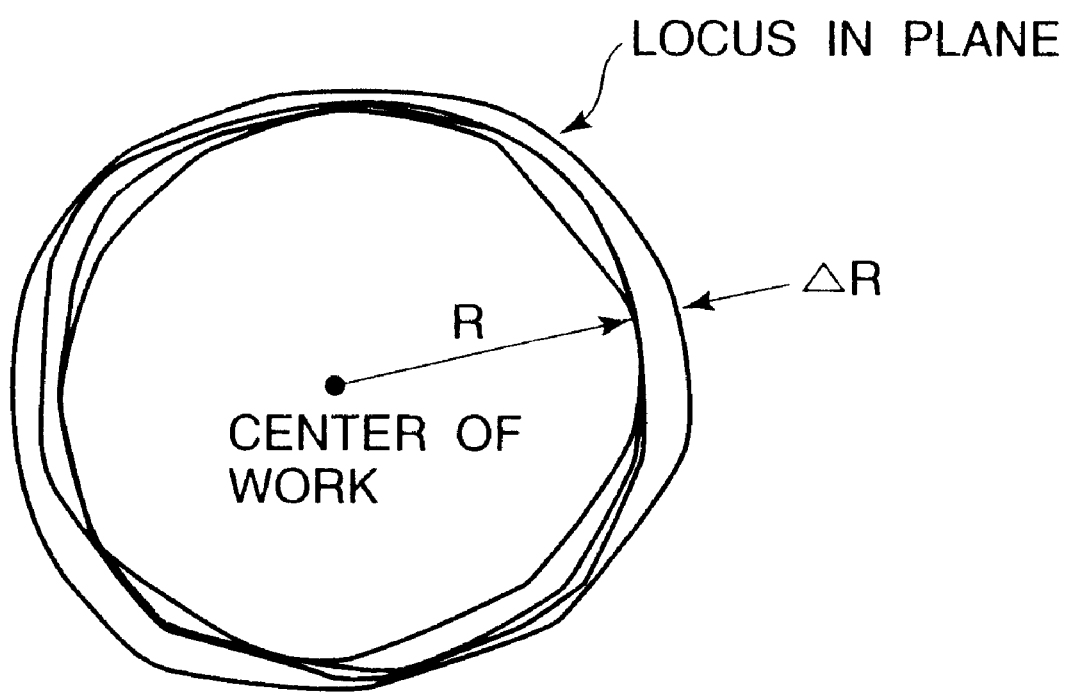
FIG. 6 is a plan view superposing the plane locus of the measuring element for explaining the axial runout of side face of the same.

Referring now to the drawings, an embodiment of the invention applied in measurement of pitch deviation and axial runout of side face of worm gear is described in detailed below.

Figure 7:
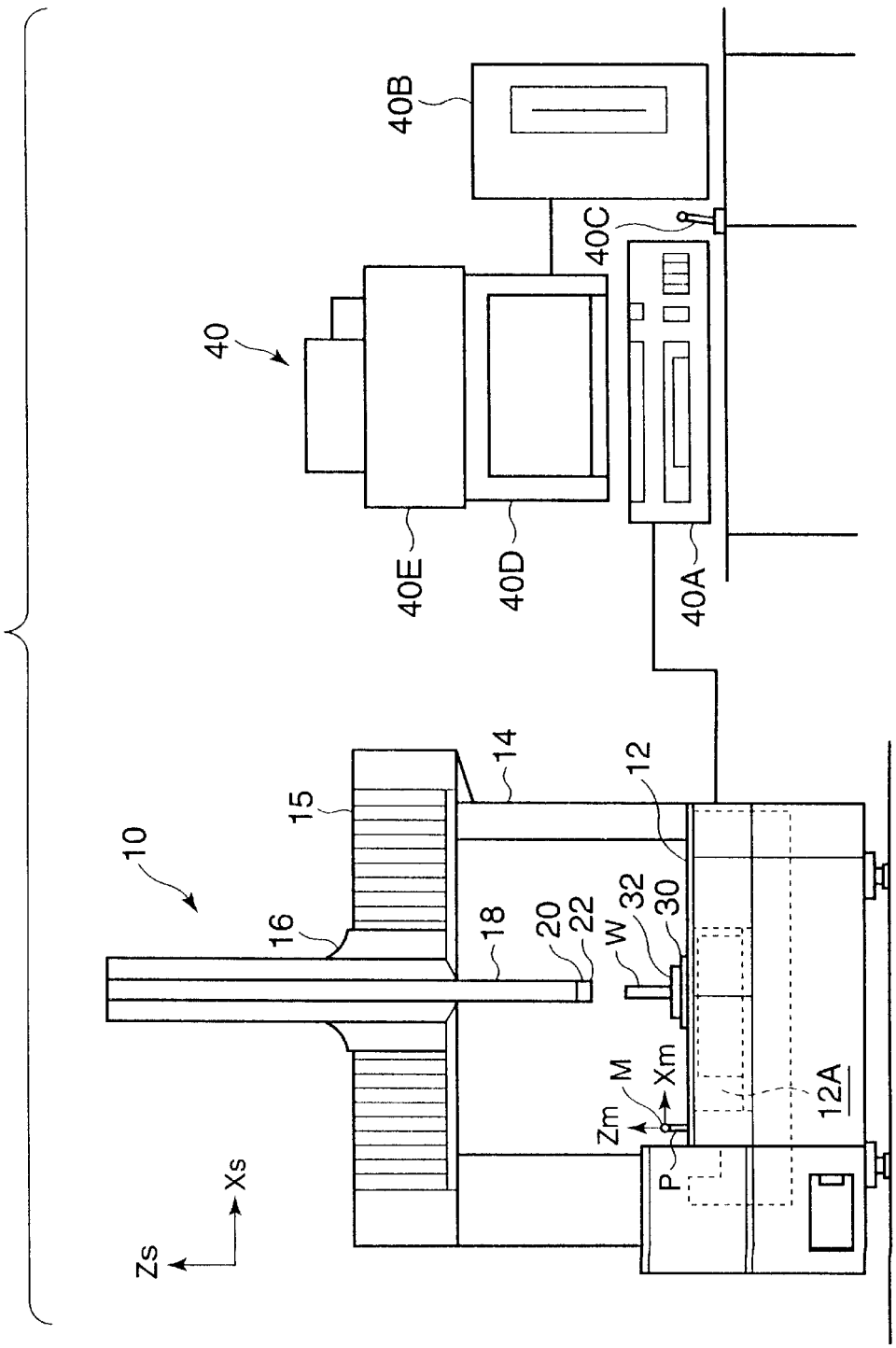
FIG. 7 is a front view showing an embodiment of the invention assembled in a three-dimensional measuring machine.
Figure 8:
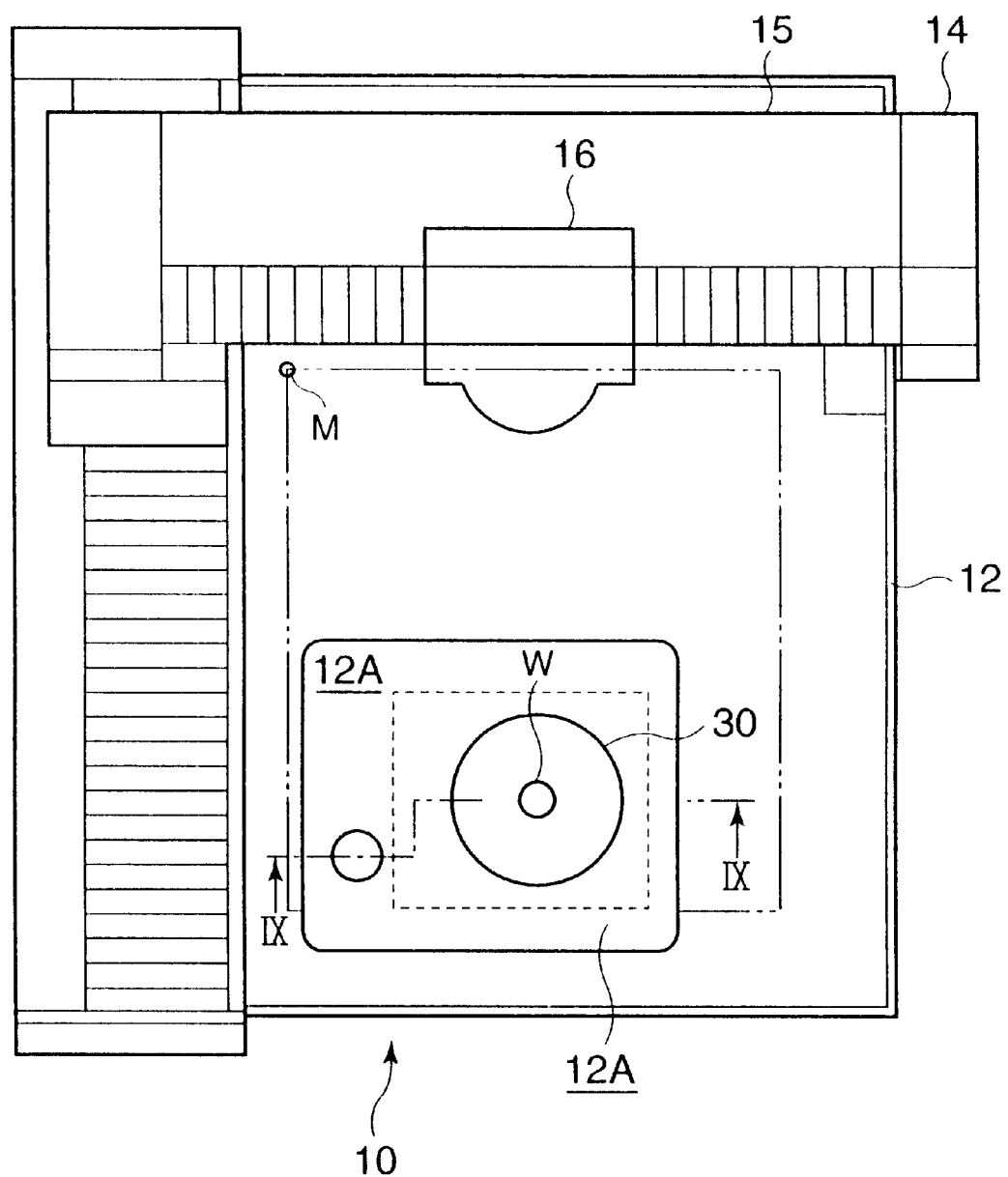
FIG. 8 is a plan view thereof.
Figure 9:
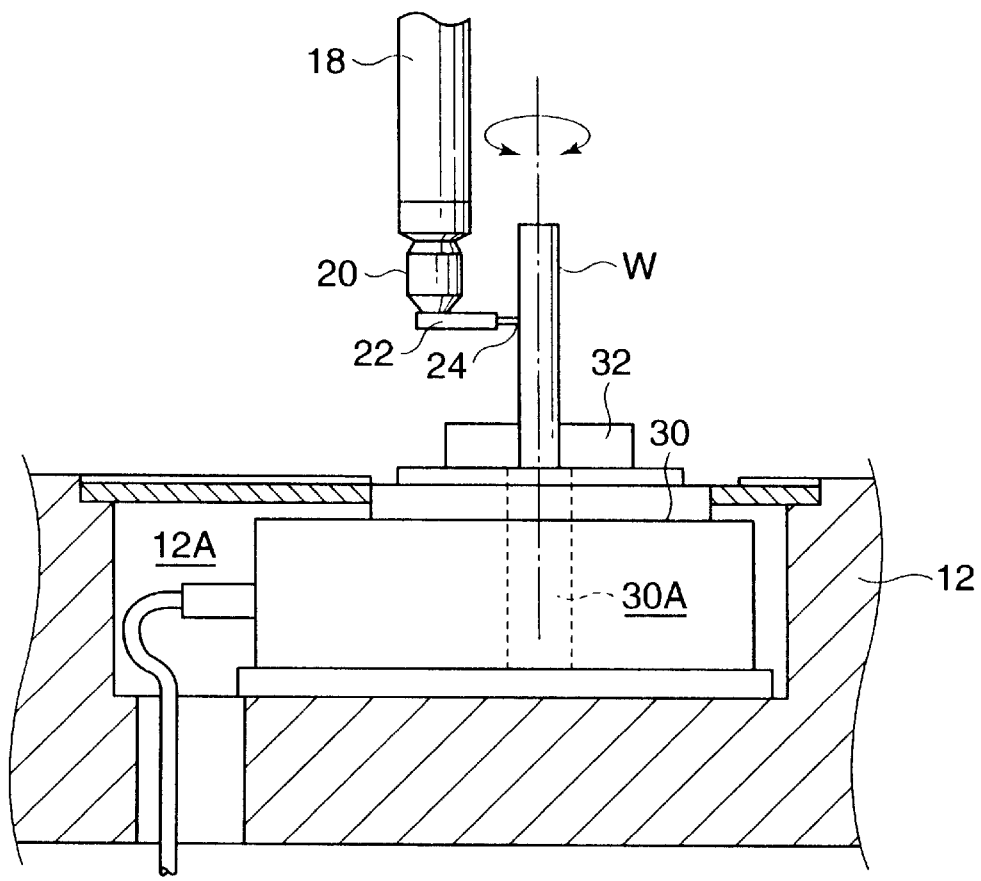
FIG. 9 is an essential sectional view along line IX—IX in FIG. 8, showing a buried state of the rotary table of the same.

According to the invention, as shown in FIG. 7 (front view), FIG. 8 (plan view), and FIG. 9 (essential sectional view along line IX—IX of FIG. 8), a recess 12A is formed in a platen 12 of a three-dimensional measuring machine 10 having a probe 22 for measuring coordinates, and a rotary table 30 is placed therein, a work (worm gear) W is fixed on a chuck 32 of the rotary table 30, and the V-groove of the work W is scanned and measured by using the probe 22 while rotating the work W by the rotary table 30.

In the drawings, M is a master ball of a known true sphere of accurate diameter, fixed on a pole P planted at a corner of the platen 12 in order to calibrate the difference in the diameter of the measuring element 24, reference numeral 40 (FIG. 7) is a control/data processing device for conducting the V-groove rotary table (RT) scanning and controlling used in the invention, and taking in the data (three-dimensional) of the locus of the V-groove of the screw obtained therefrom as measured values, and analyzing the data to determine the characteristic values such as pitch deviation and axial runout of side face of the screw.

The control/data processing unit 40 comprises, as shown in FIG. 7, a central processing unit 40A, a memory device 40B, a joystick 40C, a monitor 40D, and a printer 40E, and the program for processing according to the embodiment is stored in the memory device 40B.

Figure 10:
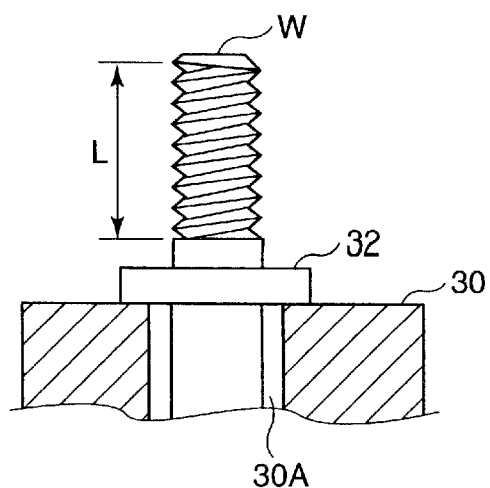
FIG. 10 is an essential sectional view showing a fixed state of a long work on a chuck of the rotary table.

In the center of rotation of the rotary table 30, and in the platen 12 immediately beneath it as required, a hole 30A is opened as shown in FIG. 9, and by receiving the lower end of a long work W, the effective measuring range L of the threads of the work W having the threads cut only in the upper part of the work W, as shown in FIG. 10, can be maintained within the movable range of the probe 22 of the three-dimensional measuring machine 10. By contrast, if the work W is fixed on the rotary table 30 without opening a hole, even if the measuring range of the work W is its upper half, only half of the vertical moving range of the probe 22 can be utilized, and the threads may not be measured completely depending on the dimensions over the platen 12 of the three-dimensional measuring machine 10.

Figure 11:
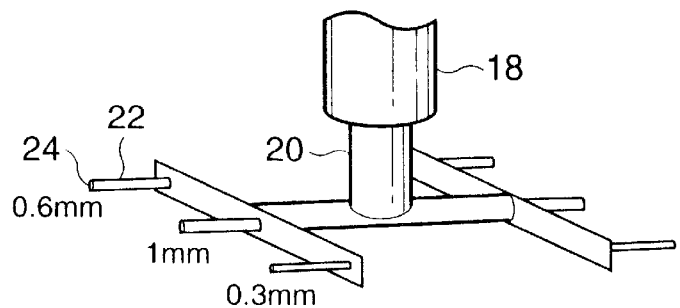
FIG. 11 is a perspective view showing the probe shape of the embodiment.

As shown in FIG. 11, for example, three probes 22 may be disposed parallel at one side of an H-shaped holder 20, and the measuring elements are 0.3 mm, 0.6 mm and 1 mm in diameter individually, so that a measuring element of a proper size can be selected depending on the size of the V-groove of the object of measurement.

Figure 12:
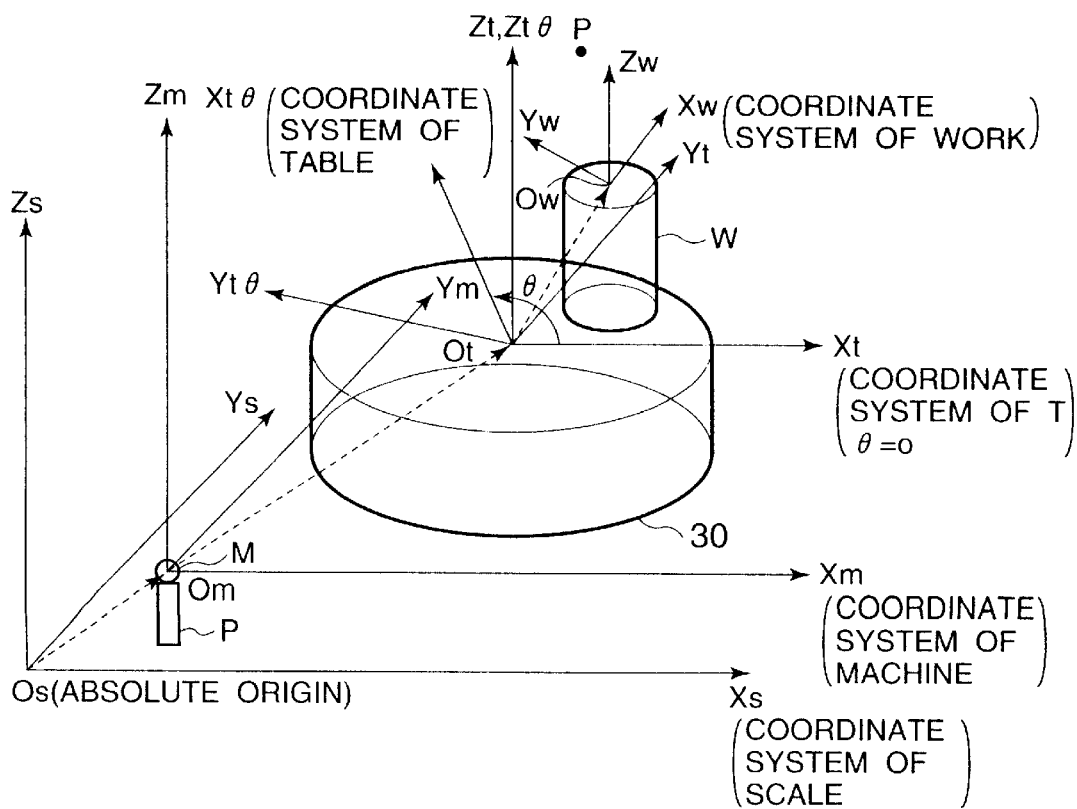
FIG. 12 is a perspective view showing the relation of coordinate system of the embodiment.

The relation of the system of coordinates used in measurement is shown in FIG. 12. In the diagram, (Xs, Ys, Zs) represents a coordinate system of the three-dimensional measuring machine 10 having the origin at the absolute origin Os of the scale provided in the three-dimensional measuring machine 10 (called coordinate system of scale); (Xm, Ym, Zm) does a coordinate system of the coordinate system of scale moved parallel to the center of the master ball M (called coordinate system of machine); (Xt, Yt, Zt) does a coordinate system of the rotary table 30 when the rotational angle θ of the rotary table 30 is 0 (called coordinate system of T) ; (Xtθ, Ytθ, Ztθ) does a coordinate system of the coordinate system of T rotated by the rotational angle θ of the rotary table 30 (called coordinate system of table); and (Xw, Yw, Zw) does a coordinate system of the work W (called coordinate system of work). Herein, the coordinate system of scale and coordinate system of machine are different strictly, but they are only moved parallel, and the both systems are commonly called the coordinate system of machine hereinafter. In this embodiment, basically, the speed data is calculated by the coordinate system of T, and the operation is controlled by the coordinate system of machine.

Figure 13:
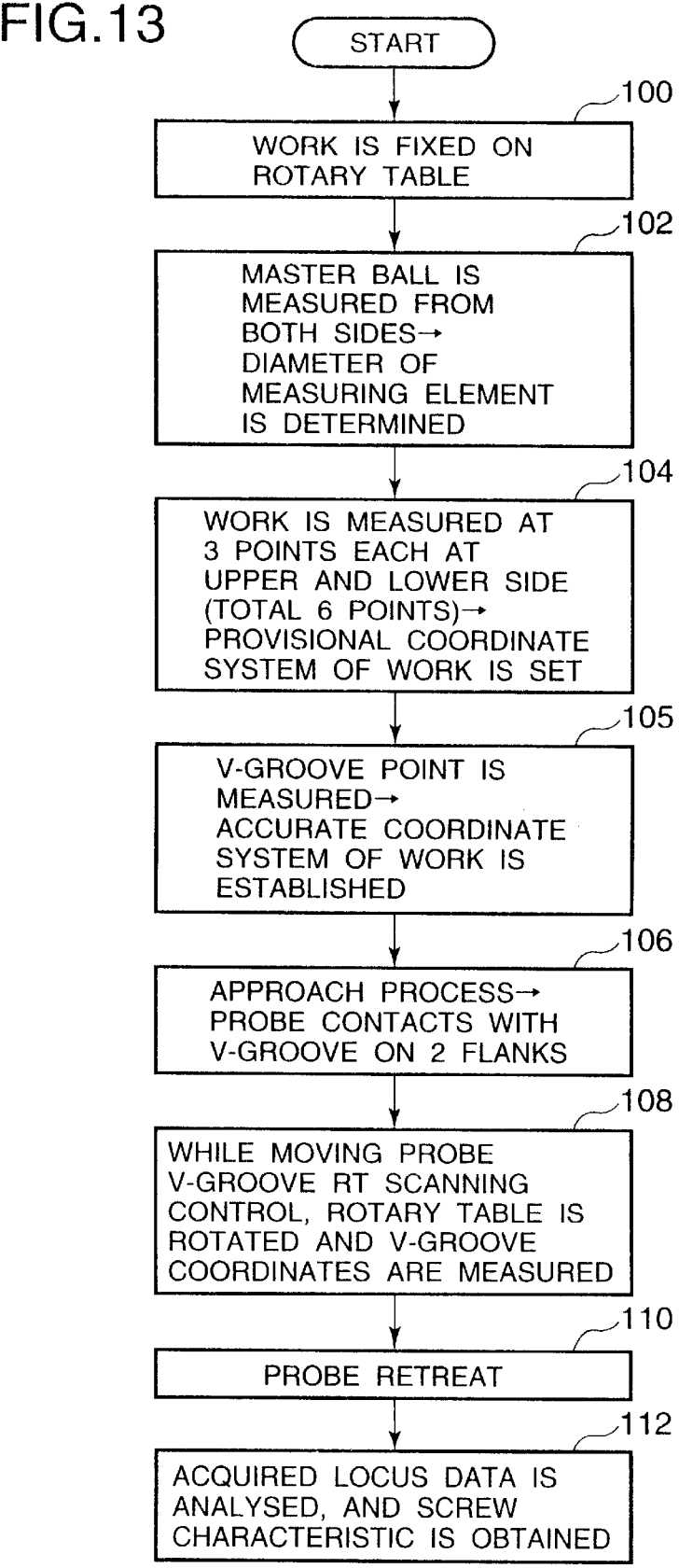
FIG. 13 is a flowchart showing general processing procedure of the embodiment.

Referring to FIG. 13, the measuring procedure of the embodiment is explained below.

In measurement, first at step 100, the work W is put on the rotary table 30, and fixed by the chuck 32.

At step 102, by manipulating the joystick 40C, the probe 22 is moved, the master ball M is measured from both sides by the measuring elements 24 used in measurement, and the diameter of the measuring elements 24 is determined, and the difference of plural measuring elements is adjusted.

Figure 14:
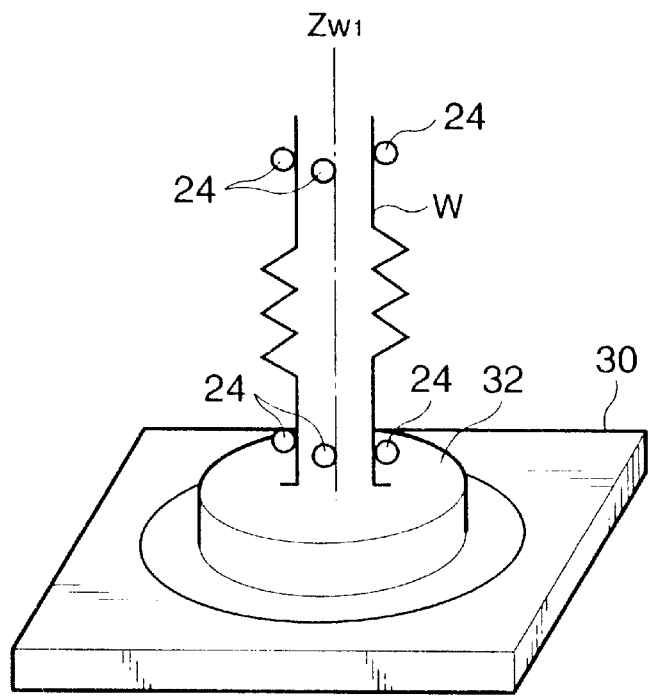
FIG. 14 is a perspective view showing a state of setting a provisional work coordinate system before start of measurement in the embodiment.

Going to step 104, moving the probe 22 by the joystick 40 as shown in FIG. 14, the coordinates of the work W fixed on the chuck 32 are measured at three points each in upper and lower halves, in a total of six points, and a provisional coordinate system of work Zw1 is set. Herein, the X-axis Xw1 and Y-axis Yw1 are arbitrary directions. This provisional coordinate system is used for the purpose of bringing the measuring element 24 of the probe 22 preliminarily closer to the surface of the work W when executing control according to the invention, and may involve an error.

Figure 15:
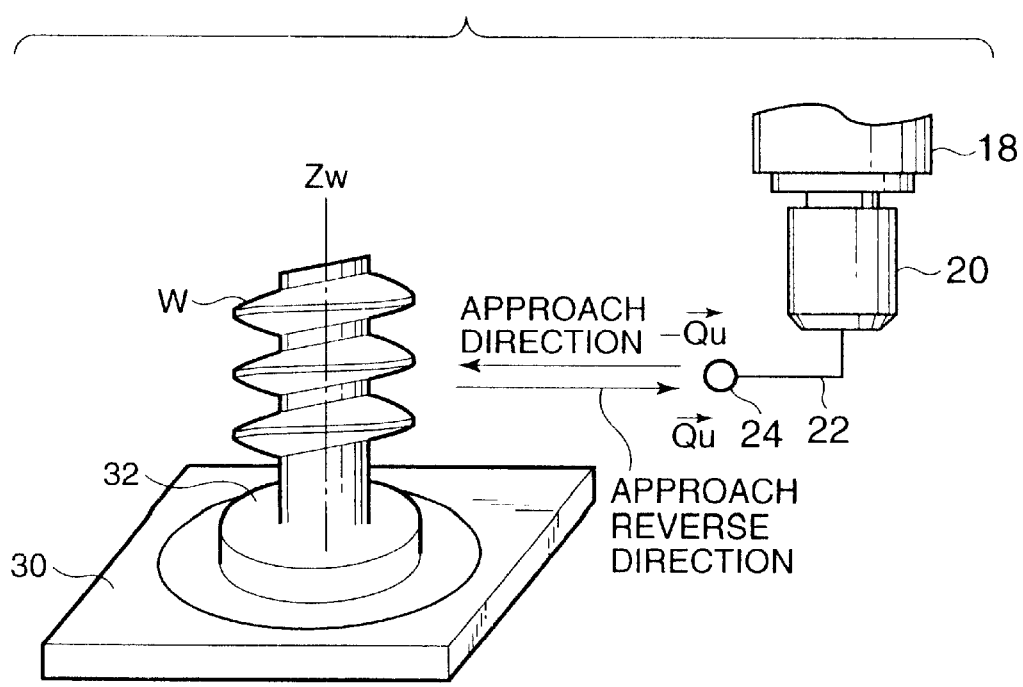
FIG. 15 is a perspective view showing a state of the probe approaching to the work.
Figure 16:
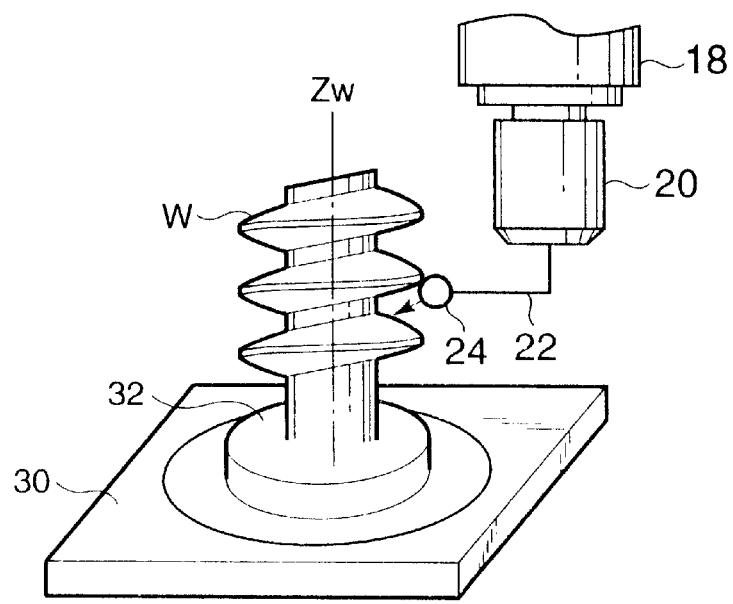
FIG. 16 is a perspective view showing a state of approaching process.
Figure 17:
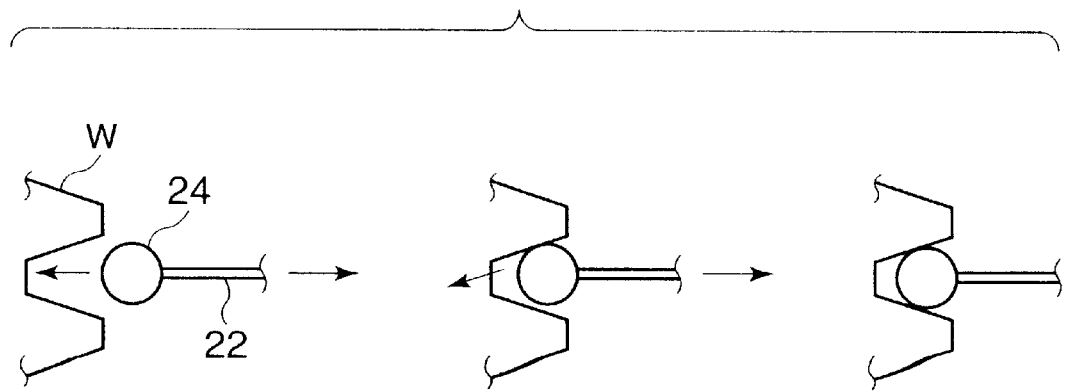
FIG. 17 is an essential magnified view thereof.
Figure 29:
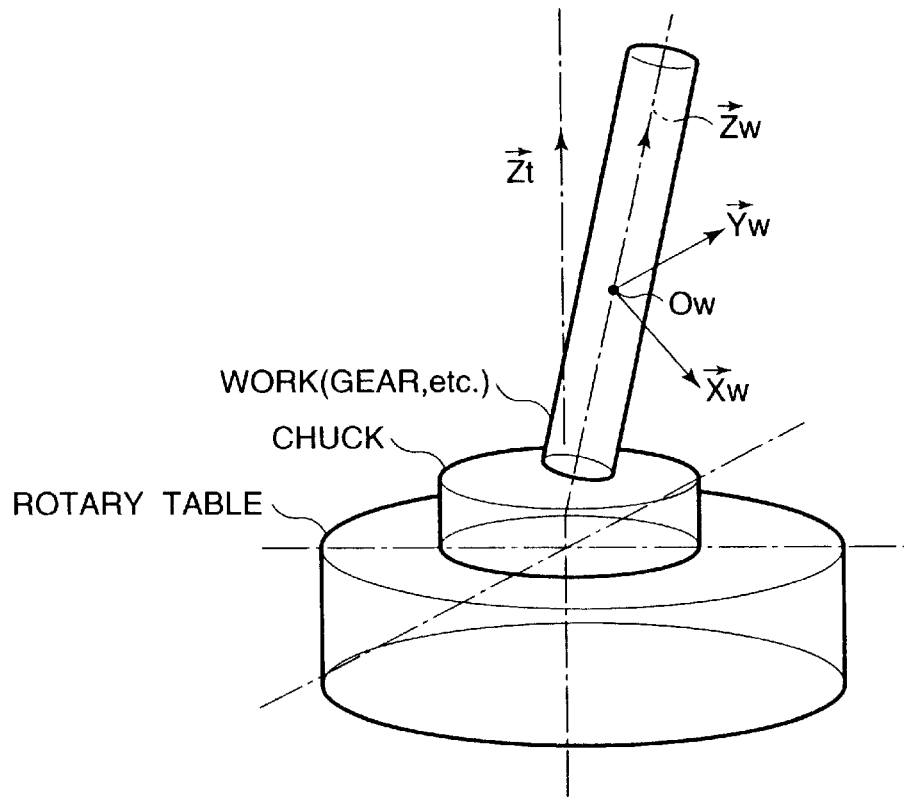
FIG. 29 is a diagram showing the relation of central axis of rotary table and work coordinate system.
Figure 30:
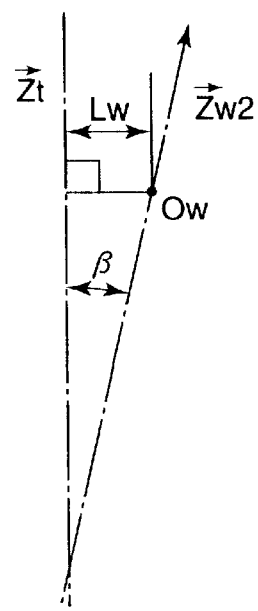
FIG. 30 is a diagram showing $\beta$ and Lw.

At next step 105, using the provisional coordinate system of work Zw1, the measuring element 24 is brought closer by the V-groove point measuring function as shown in FIG. 15 to FIG. 17, until contacting exactly with two upper and lower planes of the V-groove of the work W (this step is called the approach process), and six upper and lower points of the V-groove are measured, and cylindrical process is operated, so that an accurate coordinate system of work Zw is established. This coordinate system of work Zw and the coordinate system of T Zt may not always coincide as shown in FIG. 29, mainly due to center deviation of the chuck 32 and cutting error of the work W. Therefore, as shown in FIG. 30, there are angle β formed by Zt of the coordinate system of T and Zw2 obtained by projecting Zw of the coordinate system of work on the plane including the origin Ow of the coordinate system of work and Zt of the coordinate system of T, and distance Lw between Ow and Zt.

This approach process is executed because, when approaching, the measuring element 24 does not always contact with the upper and lower two flanks of the V-groove, and hence the rotary table 30 does not rotate. For example, when approaching in the direction of one axis (for example, X-axis) of the coordinate system of machine, by clamping the direction of other axis (for example, Y-axis) of the probe 22, effects of friction can be eliminated, and the measuring precision of the radial component can be enhanced.

Going to step 106, using the accurate coordinate system of work Zw, the measuring element 24 approaches as shown in FIG. 15 to FIG. 17 same as at step 105, and accurately contacts with the upper and lower two flanks of the V-groove of the work W.

Figure 18:
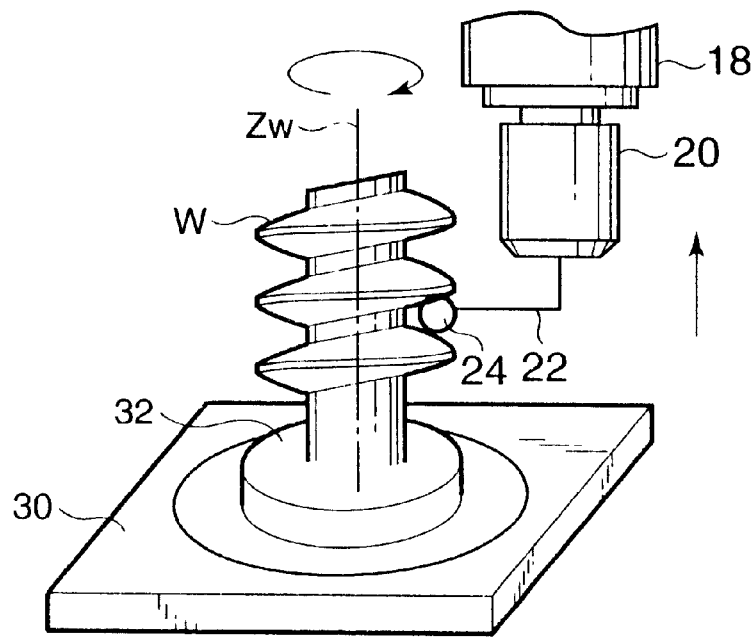
FIG. 18 is a perspective view showing a state of V-groove RT scanning of the same.

After the approach process, going to step 108, the V-groove is measured by V-groove RT scanning control as shown in FIG. 18.

Figure 19:
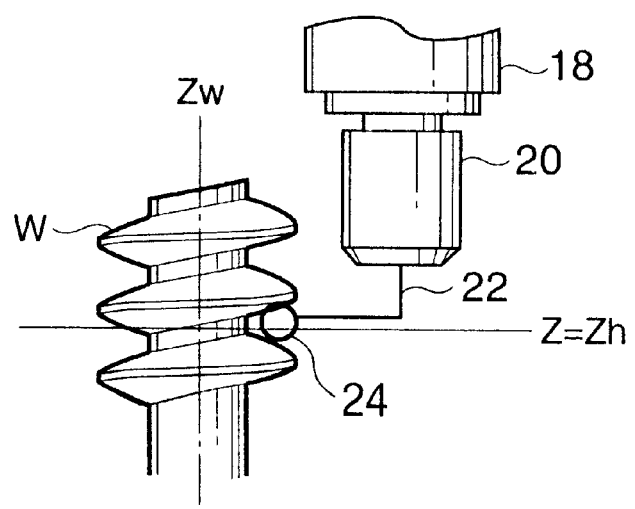
FIG. 19 is a perspective view showing a finished state of V-groove RT scanning of the same.

As shown in FIG. 19, when reaching the measurement end position (height Z=Zh in the diagram), going to step 110, the probe 22 retreats.

Going to step 112, the locus data (three-dimensional) of the measured V-groove is taken in as measured values, and the data is analyzed, and the characteristic values such as pitch deviation and axial runout of side face are determined.

Figure 20:
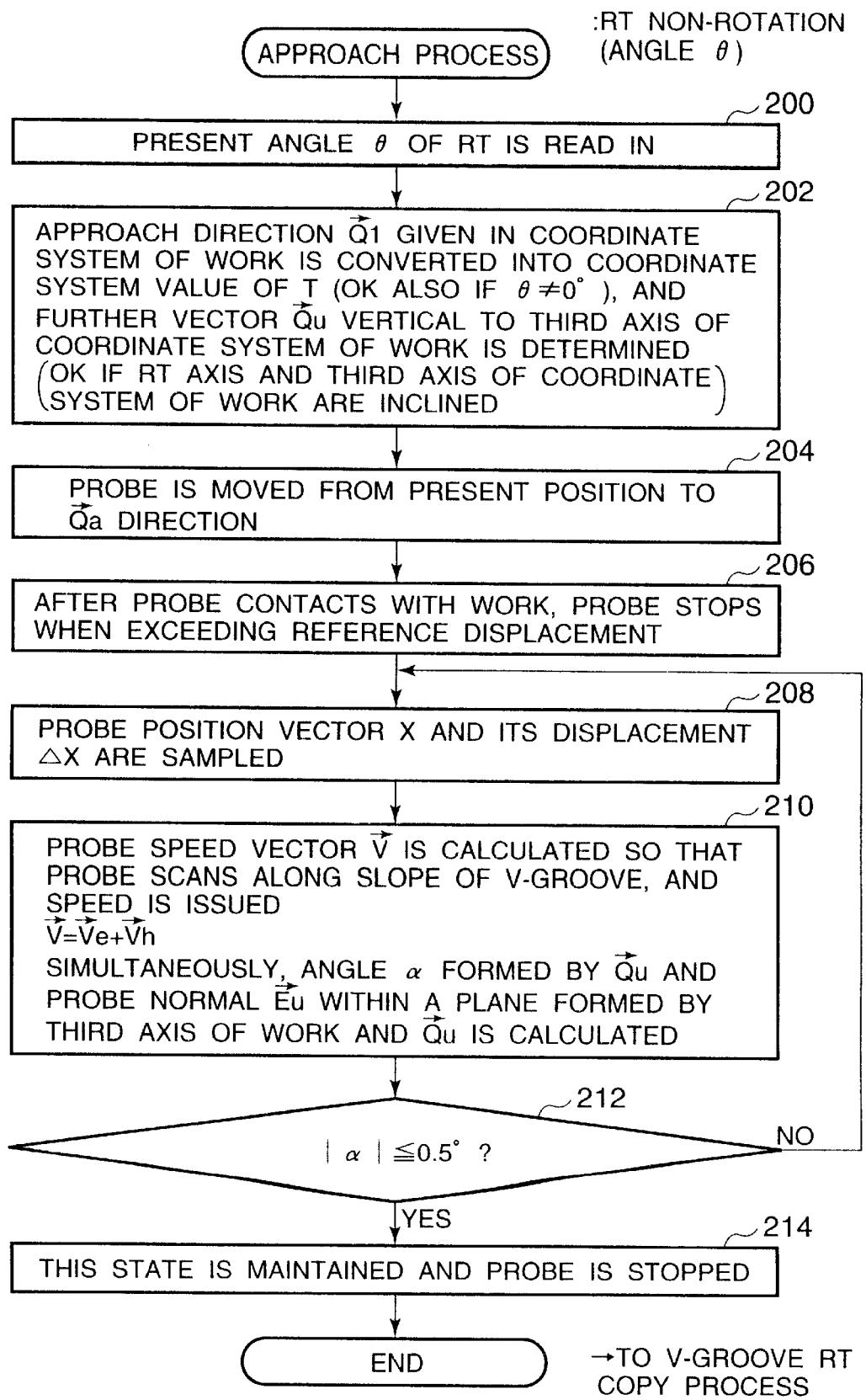
FIG. 20 is a flowchart showing the procedure of approaching processing.

The approach process at step 106 is specifically executed in the procedure as shown in FIG. 20.

First, at step 200, the present rotational angle θ of the rotary table 30 is read in.

Going to step 202, the approach direction vector Q1 given in the coordinate system of work is converted into the value of coordinate system of T (possible if θ≠0), and further the approach inverse direction vector Qu vertical to the work axial center (called third axis) of the coordinate system work is determined. Herein, the axis of rotation of the rotary table 30 and the third axis of the coordinate system of work may be inclined as shown in FIG. 29. The amount of inclination may be expressed by two values, that is, angle β formed by Zt of the coordinate system of T and Zw2 obtained by projecting Zw of the coordinate system of work on the plane including the origin Ow of the coordinate system of work and Zt (axis of rotation of rotary table), of the coordinate system of T, and distance Lw between Ow and Zt.

More specifically, by the following formula, vector Q2 is determined by multiplying the approach direction vector Q1 given in the coordinate system of work, and the coordinate conversion matrix M for converting the coordinate system of table into coordinate system of T when the table rotational angle is θ.

$$\vec{Q2} = M\vec{Q2} \qquad (1)$$

$$M = \begin{bmatrix} \cos\theta & -\sin\theta & 0 \\ \sin\theta & \cos\theta & 0 \\ 0 & 0 & 1 \end{bmatrix}$$

Next, in the following formula, vector Q3 is determined as the exterior product of this vector Q2 and work third axis vector gθ in the coordinate system of T.

$$\vec{Q3} = \vec{g}\theta \times \vec{Q2} \qquad (2)$$

Then, as shown in formula 3, from this vector Q3, vector Q at right angle to the work third axis vector $g\theta$ is determined, and vector Q is transformed into unit vector in formula (4), and approach reverse direction vector Qu is obtained.

$$\vec{Q} = \vec{Q}3 \times \vec{g}\theta \quad (2)$$

$$\vec{Q}u = \frac{|\vec{Q}|}{\vec{Q}} \quad (4)$$

By making this vector Qu as to be the approach reverse direction, the approach process to the work and the V-groove RT scanning process are possible, even if the work axis and the axis of rotation of the rotary table are inclined, or if the rotary table starts to rotate from other angle than reference value (for example, $\theta=0°$). In the approach process, if the value of $\beta$ and Lw are smaller than specified values, and the coordinate system of T and coordinate system of work are regarded to be sufficiently in coincidence, the operations by formulas (1) to (3) at step 202 may be omitted, and the vector Qu may be determined by assuming Q=Q2.

Going to step 204, as shown in FIG. 15, the probe is moved from the present position to the approach direction Qa(=−Qu).

Going to step 206, as shown in FIG. 16, after the measuring element 24 has contacted with the work W, when its displacement exceeds a reference value (for example, 1 mm), the probe 22 is stopped.

Going to step 208, position vector X of measuring element at the probe leading end and its displacement $\Delta X$ are sampled.

Going to step 210, as indicated by arrow in FIG. 16 and FIG. 17, the speed vector V of the probe is calculated in the following formula, and a speed output is obtained in order that the measuring element may scan along the slope of the V-groove.

$$\vec{V} = \vec{V}e + \vec{V}h \quad (5)$$

where $\vec{V}e$: displacement correction vector $\vec{V}h$: two-flank contact vector The displacement correction vector Ve (coordinate system of T) for keeping the probe displacement constant is calculated as follows.

First, in order to cancel the offset such as friction in stationary state, the value I is determined in the following formula.

$$I = Kc1 \int (|\vec{E}| - E0) dt \quad (6)$$

where

Kc1: integral constant

E0: reference displacement $|\vec{E}|$: size of probe displacement when sampling Using this value I, the displacement correction vector Ve is determined in the following formula.

$$\vec{V}e = Ke(|\vec{E}| - E0 - I \times Sp) \vec{E}u \quad (7)$$

where

Ke: displacement correction gain

Sp: speed factor (described later)

$\vec{E}u = \vec{E}/|\vec{E}|$

In formula (5), Vh is the vector (called two-flank contact vector) of coordinate system of T for contacting with two flanks of the V-groove, which is determined as follows.

That is, to correct the deviation of the probe normal vector Eu and approach reverse direction vector Qu, a vector (called deviation correction vector) h is determined in the following formula.

$$\vec{h} = \vec{E}u - \vec{Q}u \quad (8)$$

Using this deviation correction vector h, the work third axis direction vector hs is obtained as follows.

$$\vec{h}s = (\vec{h}, \vec{g}\theta) \vec{g}\theta \quad (9)$$

Using the work third axis direction vector hs obtained in formula 9, the two-flank contact vector Vh is determined in the following formula.

$$\vec{V}h = Kh \cdot \vec{h}s \quad (10)$$

where Kh: V-groove deviation correction gain

At foregoing step 210, simultaneously when calculating the speed vector V of the probe, the angle $\alpha$ formed by vector Qu and probe normal vector Eu in the plane formed by the approach reverse direction vector Qu and work third axis calculated.

Going to step 212, it is judged if the angle $\alpha$ is the specified value, for example, within 0.5° or not. If judged No, returning to step 208, the move of the probe is continued.

If judged Yes at step 212, as shown in FIG. 21, when the angle $\alpha$, which is same as the thread angle of 60° at the time of one-flank contact, is judged to become within 0.5° by two-flank contact, it is determined to be two-flank contact, and the probe is stopped at step 214, and the V-groove point output is generated, thereby finishing the approach process.

Figure 22:
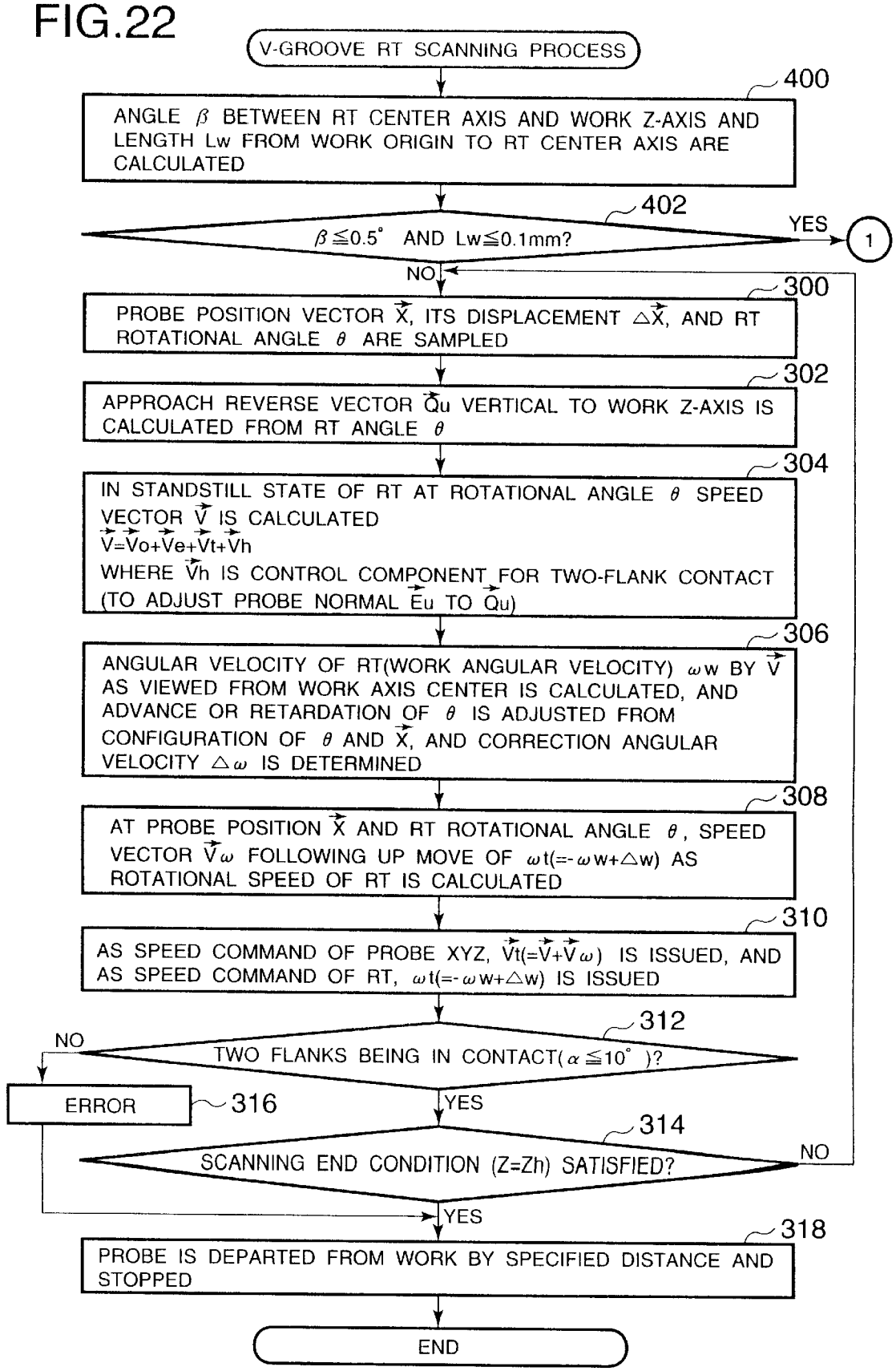
FIG. 22 is a flowchart showing the procedure of V-groove RT scanning after approach processing.

Next to the approach process, the V-grove RT scanning process at step 108 in FIG. 13 is executed in the procedure as shown in FIG. 22.

At step 400, calculating Zw2 obtained by projecting the third axis Zw of the coordinate system of work on a plane including the origin Ow of the coordinate system of work and third axis Zt of the rotary table, the angle $\beta$ formed by this Zw2 and Zt is calculated. Further, the distance Lw of Ow and Zt is calculated.

Figure 28:
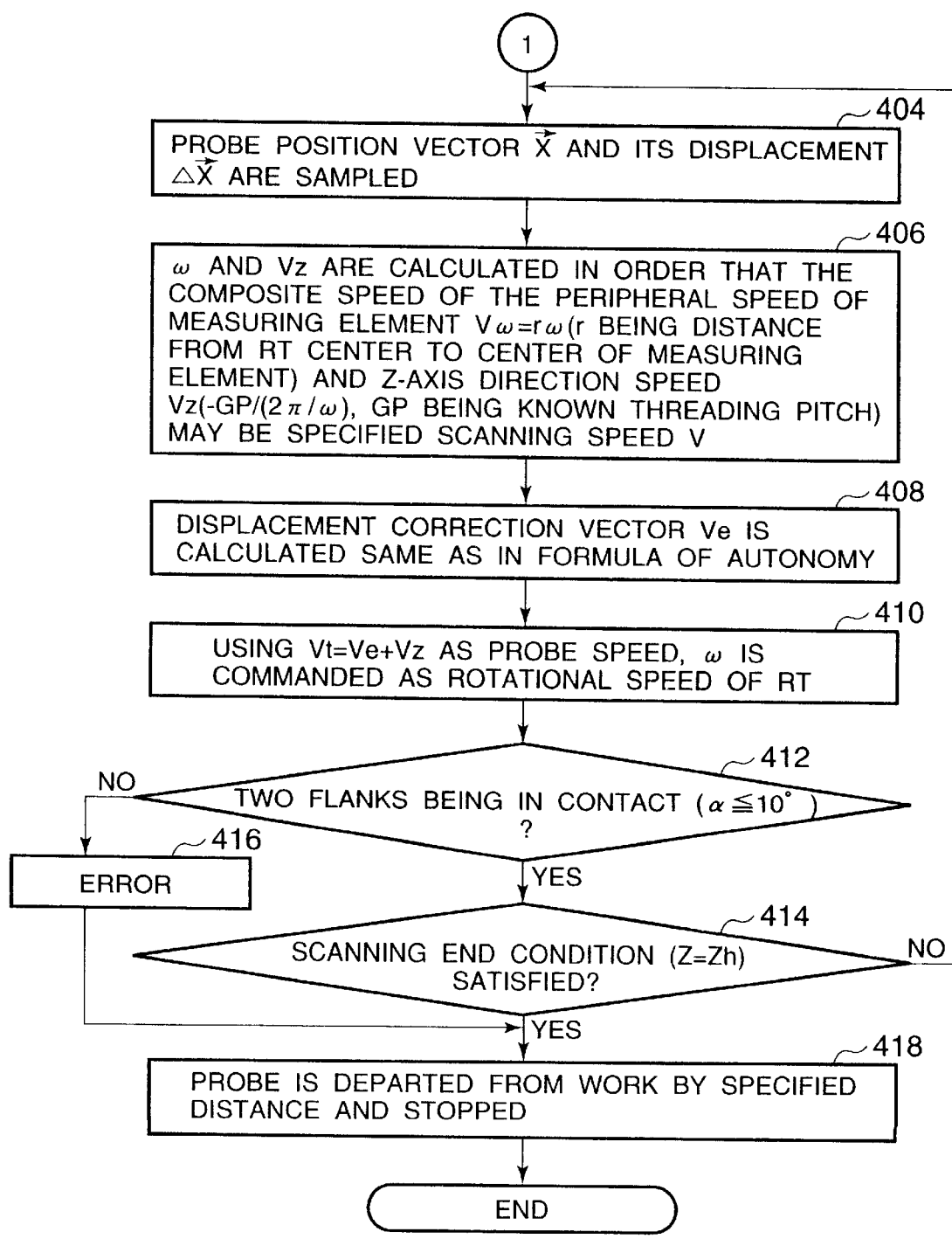
FIG. 28 is a flowchart showing the procedure of V-groove RT scanning process in the semi-autonomous mode.

Going to step 402, if $\beta \leq 0.5°$ and Lw $\leq 0.1$ mm, the process goes to step 404 shown in FIG. 28. Otherwise, the process goes to step 300. The process after step 300 is called the autonomic mode, and the process after step 404 is called the semi-autonomic mode.

The autonomic mode is explained first. At step 300, position vector X of probe (measuring element), its displacement $\Delta X$, and rotational angle $\theta$ of rotary table 30 are sampled.

Going to step 302, in the same manner as explained at step 202 in FIG. 20, the approach reverse direction vector Qu vertical to the work third axis Zw is calculated from the table rotational angle $\theta$.

Going to step 304, the speed vector V of the probe when the rotary table 30 is stopped still at rotational angle $\theta$ is calculated by the following formula.

$$\vec{V} = \vec{V}0 + \vec{V}e + \vec{V}r + \vec{V}h \quad (11)$$

where $\vec{V}0$: basic speed vector $\vec{V}e$: displacement correction vector $\vec{V}r$: radius correction vector $\vec{V}h$: two-flank contact vector The basic speed vector V0 (coordinate system of T) is calculated as follows.

Figure 23:
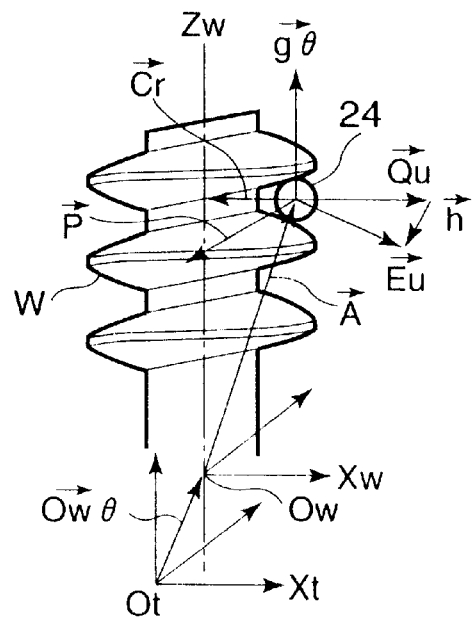
FIG. 23 is a diagram showing the relation of control direction in the embodiment.

From the relation shown in FIG. 23, the operation is carried out to determine vector gθ parallel to the work third axis Zw in the coordinate system of T expressed in formula (12), origin vector Owθ going from the origin Ot of the coordinate system of T toward the origin Ow of the coordinate system of work expressed in formula (13), and vector A going from the origin vector Ow θ toward the center of the measuring element expressed in formula (14).

$$\vec{g}\theta = M\vec{g} \tag{12}$$

$$\vec{O}w\theta = M\vec{O}w \tag{13}$$

$$\vec{A} = \vec{P}c - \vec{O}w\theta \tag{14}$$

where

M: coordinate conversion matrix from Tθ to T (RT rotational angle=θ°)

$\vec{P}c$: probe center vector (coordinate system of T)

Next, vector Cr vertically down on the work third axis from the center of measuring element is determined in formula (15), and its unit vector Cru is determined in formula (16).

$$\vec{C}r = (\vec{A}, \vec{g}\theta)\vec{g}\theta - \vec{A} \tag{15}$$

$$\vec{C}ru = \frac{Cr}{|\vec{C}r|} \tag{16}$$

As shown in formula (17), consequently, probe advancing direction vector P is determined from the exterior product of work th1rd-axis vector gθ and the unit vector Cru, and its unit vector Pu is determined in formula (18).

$$\vec{P} = \vec{g}\theta \times \vec{C}ru \tag{17}$$

$$\vec{P}u = \frac{P}{|\vec{P}|} \tag{18}$$

The gear lead angle may be considered in the advancing direction, but in this embodiment, since the control sampling time is as short as 2 msec, the moving distance in this period is very small, and hence the lead angle is ignored.

Using the advancing direction unit vector Pu obtained in formula (18), the basic speed vector V0 may be determined in the following formula.

$$\vec{V}o = V \cdot Sp \cdot \vec{P}u \tag{19}$$

where

V: scanning speed

Sp: speed factor.

The speed factor Sp is used for lowering the moving speed so as to assure the displacement in each sampling time in the case the scanning speed is too fast and the measuring element may be departed from the V-groove surface, and it is usually a value close to 1.

The displacement correction vector Ve (coordinate system of T) and two-flank contact vector vh (coordinate system of T) used in formula (11) are calculated in the same manner as explained at step 210 in FIG. 20. In calculation of the displacement correction vector Ve, assuming value I=0, formula (7) may be simplified.

The radius correction vector Vr (coordinate system of T) used in formula (11) is calculated as follows.

First, the process up to end of two-flank contact is same as in the approach process.

Then, when the angle α of the probe normal and approach reverse direction becomes less than 0.5°, position Pt is taken in, and radius r in V-groove RT scanning which is the distance of Pt and Z-axis is simultaneously determined in the following formula, and converted into the value of coordinate system T.

$$r = \sqrt{(Xt^2 + Yt^2)} \tag{20}$$

Using this V-groove RT scanning radius r, the radius correction vector Vr is determined as follows:

$$\vec{V}r = -Kr(|\vec{C}r| - r)\vec{C}ru \tag{21}$$

where Kr: radius correction gain.

In the conventional RT radius constant scanning control, the radius correction direction is determined by the exterior product of vector Pu and vector Eu, but in the V-groove RT scanning in this embodiment, the radius correction direction is the Cru direction mentioned above.

In the embodiment, as shown in formula (11), the radius correction vector Vr is added when determining the probe speed vector V, the axial runout of side face is decreased, and measurement of high precision is possible. In formula (11), by omitting the radius correction vector Vr, the probe speed vector V may be determined also as the sum of the basic speed vector V0, displacement correction vector Ve, and two-flank contact vector Vh.

After calculating the probe speed vector V at step 304 in FIG. 22, going to step 306, the angular velocity of rotary table (called work angular velocity) ωw due to probe speed vector V as seen from the work axial center is calculated, and from the configuration of θ and X, advancement or retardation of θ is adjusted, and the corrected angular velocity Δω is determined.

Figure 24:
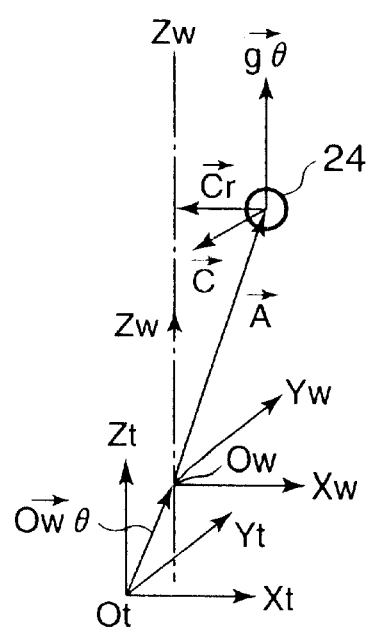
FIG. 24 is a diagram showing a determination state of the tangential direction of the same.

More specifically, using the probe center vector (coordinate system of T) Pt when two flanks contact in approach process, the tangential direction vector C shown in FIG. 24 is determined before start of RT scanning.

That is, the work third axis vector gθ in the coordinate system of T, origin vector Owθ, and vector A going from origin vector Owθ toward probe center Pt are determined in the following formulas (22) to (24).

$$\vec{g}\theta = M\vec{g} \tag{22}$$

$$\vec{O}w\theta = M\vec{O}w \tag{23}$$

$$\vec{A} = \vec{P}t - \vec{O}w\theta \tag{24}$$

where

M: coordinate conversion matrix from Tθ to T (RT rotational angle=θ°)

$\vec{P}t$: probe center vector (coordinate system of T)

Next, vector Cr vertically down on the work third axis from the center of measuring element is determined in the following formula.

$$\vec{C}r = (\vec{A}, \vec{g}\theta)\vec{g}\theta - \vec{A} \tag{25}$$

Projecting this vector Cr on the Xt-Yt plane, vector Ct shown in formula (26) is determined, and further rotating by π/2, vector C shown in formula (27) is determined, and its unit vector Cu is determined in formula (28).

$$\vec{Ct} = \begin{bmatrix} Cx \\ Cy \\ 0 \end{bmatrix} \quad (26)$$

$$\vec{C} = \begin{bmatrix} -Cy \\ Cx \\ 0 \end{bmatrix} \quad (27)$$

$$\vec{Cu} = \vec{C}/|\vec{C}| \quad (28)$$

Consequently, from the relation of V=rω, in the following formula, the work angular velocity ωw by the relative speed V of work and probe is determined.

$$\omega w = \frac{(\vec{V}, \vec{Cu})}{|\vec{Cr}|} \quad (29)$$

Figure 25:
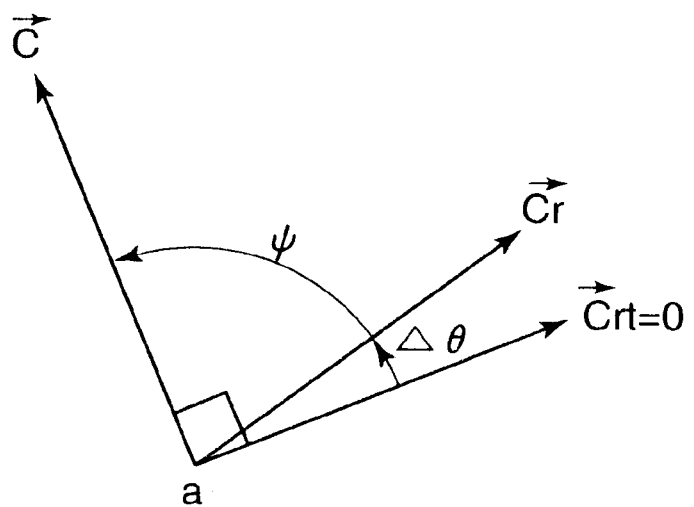
FIG. 25 is a diagram showing the relation of the vector for determining the correction angular velocity of the same.

From the relation shown in FIG. 25, the corrected angular velocity Δω is calculated for maintaining the configuration of work and probe. In FIG. 25, vector Crt=0 is a perpendicular vector down on the work third axis from the probe center determined after approach, vector C is a vector advanced by π/2 from vector Crt=0, vector Cr is a perpendicular vector down on the work third axis from the probe center determined in every sampling, and all of them are vectors within the Xt-Yt plane. Besides, "a" is the intersection of the perpendicular line from the probe center to the work third axis and the third axis.

When calculating the corrected angular velocity Δω, it is first controlled so that the probe direction Cr may be always 90° to the reference direction C. Accordingly, it is corrected by rotating by the angle corresponding to the difference (Δθ) of Cr and Crt=0.

More specifically, from the relation in FIG. 25, Δθ is calculated in the following formula.

$$\Delta\theta = (\pi/2) - \psi \quad (30)$$

If Δθ is nearly 0, formula (30) may be approximated as follows.

$$\Delta\theta = \sin\{(\pi/2) - \psi\} = \sin\{(\pi/2)\cdot\cos\psi - (\pi/2)\cdot\sin\psi\} = \cos\psi \quad (31)$$

Therefore, from the vector Cu and vector Cru, cos ψ may be determined as follows.

$$(\vec{Cu}, \vec{Cru}) = |\vec{Cu}|\cdot|\vec{Cru}|\cdot\cos\psi \quad (32)$$

$$\therefore \Delta\theta = (\vec{Cu}, \vec{Cru}) \quad (33)$$

Since ω=dθ(t)/dt, from this Δθ, the corrected angular velocity Δω may be determined in the following formula.

$$\Delta\omega = S\Delta\theta \quad (34)$$

where S: RT angular velocity compensation factor

After step 306 in FIG. 22, going to step; 308, the speed vector to follow up (follow-up speed vector) Vω when the rotary table rotates at angular velocity ωt is calculated.

First, from formula (29) and formula (34), the angular velocity ωt to be applied to the rotary table is determined in the following formula.

$$\omega t = -\omega w + \Delta\omega \quad (35)$$

Figure 26:
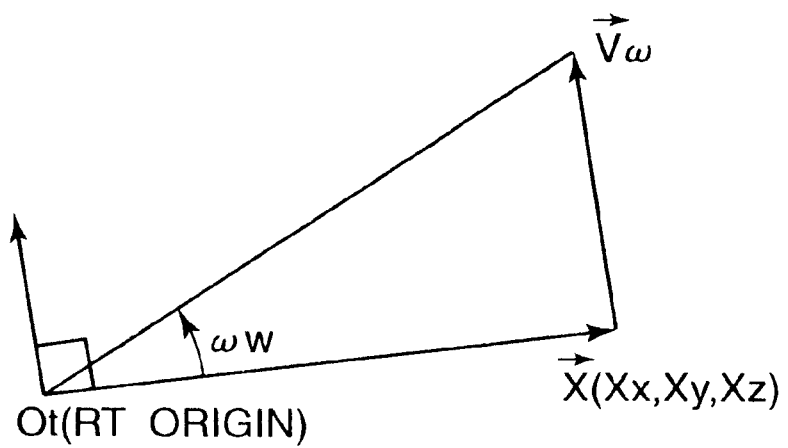
FIG. 26 is a diagram showing the linear velocity when determining the follow-up speed vector of the same.

The follow-up speed vector Vω which is the linear velocity at point X due to this angular velocity ωt is determined as follows from the relation as shown in FIG. 26.

From $\vec{V} = \vec{\omega} \times \vec{r}$, $$\vec{V}\omega t = \vec{\omega}t \times \vec{X} \quad (36)$$

$$= \begin{bmatrix} X & Y & Z \\ 0 & 0 & \omega t \\ Xx & Xy & Xz \end{bmatrix}$$

$$= \begin{bmatrix} -Xy\cdot\omega t \\ Xx\cdot\omega t \\ 0 \end{bmatrix}$$

Going to step 310, the speed Vt to be applied to the probe when angular velocity ωt is given to the rotary table at the relative speed vector V of work and probe is calculated. First, the probe speed vector Vt is determined in the following formula.

$$\vec{V}r = \vec{V} + \vec{V}\omega t \quad (37)$$

$$Vr = \begin{bmatrix} Vx \\ Vy \\ Vz \end{bmatrix} + \begin{bmatrix} -Xy\cdot\omega t \\ Xx\cdot\omega t \\ 0 \end{bmatrix} \quad (38)$$

$$= \begin{bmatrix} Vx - Xy\cdot\omega t \\ Vy + Xx\cdot\omega t \\ Vz \end{bmatrix}$$

Going to step 312, same as at step 210 of approach process, angle α formed by vectors Qu and, Eu is calculated, and when this α is maintained, for example, within 10°, it is judged to be in a state of two-flank contact.

If judged Yes, going to step 314, it is judged if reaching up to the scanning end condition, for example, when starting measurement from bottom to top of the screw, judging if reaching the specified height Zh as shown in FIG. 19, and if judged No, the process returns to step 300.

On the other hand, at step 312, if judged No and it is judged that the two-flank contact is no longer maintained, going to step 316, an error signal is generated.

If judged Yes at step 314 and it is judged that the scanning end condition is satisfied, or if an error signal is generated at step 316, going to step 318, the probe is departed from the work by a specified distance, and stopped, and the measurement is interrupted (in the event of error signal) or terminated (when satisfying the scanning end condition).

The semi-autonomous mode is explained below. At step 404, position vector X of probe (measuring element) and its displacement ΔX are sampled.

Going to step 406, ω and vz are calculated so that the magnitude of the composite speed vector V(=Vω+Vz) of the speed vector Vω ω in the peripheral direction of measuring element and speed vector Vz in the third axis direction of the coordinate system of work may become a predetermined value of scanning speed.

However, the relation of Vω=rω, Vz=GP/(2π/ω) should be satisfied.

(r: distance from third axis of coordinate system of rotary table to center of measuring element)

(GP: known torsion pitch)

At step 408, displacement correction vector Ve (coordinate system of T) is calculated in the same manner as explained at step 210 in FIG. 20. In calculation of displacement correction vector Ve, meanwhile, assuming value I=0, formula (7) may be simplified.

At step 410, speed vector Vt(=Ve+Vz) to be given to the probe is calculated and controlled. Further, ω calculated at step 406 is commanded to the rotary table and controlled.

Going to step 412, same as at step 210 of approach process, angle α formed by vectors Qu and Eu is calculated, and when this α is maintained, for example, within 10°, it is judged to be in a state of two-flank contact.

If judged Yes, going to step 414, it is judged if reaching up to the scanning end condition, for example, when starting measurement from bottom to top of the screw, judging if reaching the specified height Zh as shown in FIG. 19, and if judged No, the process returns to step 404.

On the other hand, at step 412, if judged No and it is judged that the two-flank contact is no longer maintained, going to step 416, an error signal is generated.

If judged Yes at step 414 and it is judged that the scanning end condition is satisfied, or if an error signal is generated at step 416, going to step 418, the probe is departed from the work by a specified distance, and stopped, and the measurement is interrupted (in the event of error signal) or terminated (when satisfying the scanning end condition).

In this embodiment, the rotary table is buried in the three-dimensional measuring machine, and the V-groove shape is measured by using the probe for measuring its coordinates, the screw can be measured, while effectively utilizing the measuring range, by using, for example, an existing three-dimensional measuring machine. Alternatively, without grinding the platen, the rotary table can be put on the platen, or without using three-dimensional measuring machine, an exclusive screw measuring system can be composed. The three-dimensional measuring machine is not limited to the portal frame type, but may include the O-frame type or C-frame type.

In the embodiment, as shown in FIG. 11, plural measuring elements differing in diameter are mounted on a single probe holder, so that a measuring element suited to the size of the V-groove can be easily selected and used. Or, only one measuring element may be used.

Figure 27:
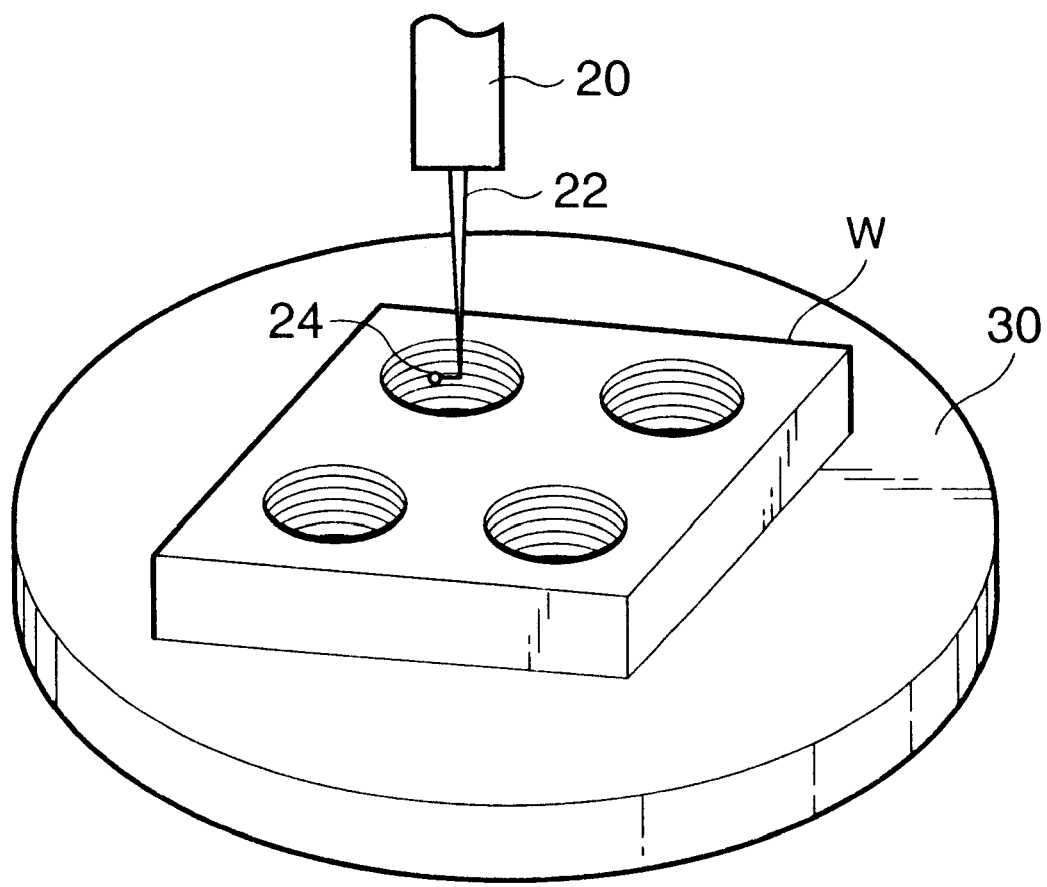
FIG. 27 is a perspective view showing a state of measuring a screw hole of a work by changing the probe in the embodiment.

Further, in the embodiment, the invention is applied in measurement of pitch deviation and axial runout of side face of worm gear, but the application of the invention is not limited, and it is also possible to measure general male threads set up and fixed on a rotary table, or characteristic values of screw hole of the work put on the rotary table by using a small probe as shown in FIG. 27. The direction of threading or screw hole is not limited to the vertical direction, but by changing the direction of the axis of rotation, it is also possible to measure in horizontal direction or other direction. Moreover, depending on the shape of the threaded surface, it is also possible to measure ball screws.

In the embodiment, the control circuit and data processing circuit are integrated into one unit, and the structure is simple, but they may be used as separate units, too.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A measuring method of V-groove shape for scanning and measuring a V-groove of an object to be measured by using a scanning probe for measuring position, while rotating the object by a rotary table, with the object having a spiral V-groove fixed on said rotary table, comprising:

controlling a measuring element direction by aiming at keeping constant a vector projected on a table plane of the rotary table of a direction vector from origin of the object to the measuring element of the scanning probe as seen from a machine coordinate system;

controlling a rotary table radius constant scanning of which a confinement plane is a cylindrical plane; and controlling a two-flank contact scanning for causing said measuring element to contact with two flanks for composing said V-groove, wherein a V-groove rotary table scanning control is performed while keeping said measuring element always in contact with the two flanks for composing the V-groove.

2. The measuring method of V-groove shape of claim 1, wherein said V-groove rotary table scanning control is realized by:

sampling a position vector X of said scanning probe, its displacement amount ΔX, and rotational angle θ of the rotary table, calculating an approach reverse direction vector Qu in a direction vertical to the axial center of the object from the rotational angle θ of said rotary table, calculating a speed vector of the probe while the rotary table is stopped at the rotational angle θ, calculating an angular velocity ωw of the rotary table by speed vector V of the probe as seen from the axial center of the object, adjusting advance or retardation from a target value of the rotational angle θ of the table due to control error from a configuration of the table rotational angle θ and the probe position X, determining a correction angular velocity Δω, and correcting the angular velocity ωw from this Δω, calculating a speed vector Vt following up movement of the correction angular velocity Δω at the probe position X and the table rotational angle θ, and calculating a vector sum Vf(=V+Vt) of the follow-up speed vector Vt and probe speed vector V to obtain a probe speed command, and correcting the angular velocity Δw by the correction angular velocity Δω to obtain value ωt(=−ωw+Δω) as a speed command of the rotary table.

3. The measuring method of V-groove shape of claim 2, wherein said speed vector V of the probe is sum of at least a basic speed vector Vo showing basic running direction of the scanning probe, a displacement correction vector Ve for keeping constant displacement of the scanning probe, and a two-flank contact vector Vh for causing the measuring element to contact with two flanks of the V-groove.

4. The measuring method of V-groove shape of claim 3, wherein a radius correction vector Vr for keeping radius constant is added to the sum to obtain the speed vector V of said probe.

5. The measuring method of V-groove shape of claim 1, wherein it is regarded as an error when two-flank contact is not maintained during said two-flank contact scanning control.

6. The measuring method of V-groove shape of claim 5, wherein it is judged that the two-flank contact is not maintained when an angle α formed by the approach reverse direction vector Qu and a vector Es projecting a probe normal vector Eu on a plane formed by the approach reverse direction vector Qu in reverse direction of approach direction corresponding to the object of the scanning probe and vector gθ corresponding to axial center of the object becomes larger than a specified value.

7. The measuring method of V-groove shape of claim 1, wherein an approach process is conducted for causing the measuring element of the scanning probe to contact with the two flanks composing the V-groove of the object before starting said V-groove rotary table scanning control.

8. The measuring method of V-groove shape of claim 7, wherein said approach process is conducted by
   moving the object and the scanning probe relatively by a relative speed vector V obtained by sum of a displacement correction vector Ve for keeping constant the displacement of the scanning probe, and a two-flank contact vector Vh for causing the measuring element to contact with the two flanks of the V-groove, and
   stopping the probe by judging that the two flanks are brought into contact when an angle α formed by an approach reverse direction vector Qu and a vector Es projecting a probe normal vector Eu on a plane formed by the approach reverse direction vector Qu in reverse direction of approach direction corresponding to the object of the scanning probe and vector gθ corresponding to axial center of the object becomes within a specified value.

9. The measuring method of V-groove shape of claim 2, wherein an approach process is conducted by
   moving the object and the scanning probe relatively by a relative speed vector V obtained by sum of a displacement correction vector Ve for keeping constant the displacement of the scanning probe, and a two-flank contact vector Vh for causing the measuring element to contact with the two flanks of the V-groove, and
   stopping the probe by judging that the two flanks are brought into contact when an angle α formed by an approach reverse direction vector Qu and a vector Es projecting a probe normal vector Eu on a plane formed by the approach reverse direction vector Qu in reverse direction of approach direction corresponding to the object of the scanning probe and vector gθ corresponding to axial center of the object becomes within a specified value.

10. The measuring method of V-groove shape of claim 6, wherein when approaching from a direction of a certain axis of the machine coordinate system, other axes are clamped so as not to move in other direction.

11. The measuring method of V-groove shape of claim 1, wherein measurement is conducted when central axis of the object and central axis of the rotary table are not matched with a specified range.

12. The measuring method of V-groove shape of claim 11, wherein it is judged that the central axis of the object and the central axis of the rotary table are matched when distance from origin of a work coordinate system having the central axis of the object as third axis to central axis of the rotary table, and angle formed by vector obtained by projecting the third axis of the work coordinate system on the plane including both origin of this work coordinate system and the central axis of the rotary table, and the central axis of the rotary table, both settle within a specified allowable range respectively, and judged that the central axis of the work and the central axis of the rotary table are not matched otherwise.

13. A measuring method of V-groove shape, by fixing an object to be measured forming a spiral V-groove on a rotary table, in the case of scanning measurement of the V-groove by using a scanning probe for measuring position while rotating the rotary table, if the central axis of the object and the central axis of the rotary table are matched within a specified allowable range, comprising:
   controlling a two-flank scanning for causing a measuring element of the scanning probe to contact with two flanks composing the V-groove; and
   controlling a pitch scanning for moving the measuring element in a central axis direction at a speed determined on the basis of the pitch of the V-groove and the rotating speed of the rotary table,
   wherein a V-groove rotary table scanning control, while keeping the measuring element always in contact with the two flanks for composing the V-groove, is executed.

14. The measuring method of V-groove shape of claim 13, wherein said V-groove rotary table scanning control is executed by:
   sampling a position vector V of the scanning probe, its displacement ΔX, and rotational angle θ of the rotary table,
   calculating an angular velocity ω of the rotary table so that composite speed of a peripheral speed Vω(=rω) produced on basis of distance r from central axis of the rotary table to a position vector X, and speed vector Vz(=GP(2π/ω) in the central axis direction of the rotary table produced on basis of a specified screw pitch GP when the rotary table is rotated at the angular velocity ω to be specified scanning speed V,
   calculating a speed vector Vz on basis of this ω value and the screw pitch GP, and
   setting the speed vector Vz as a speed vector command Vt to the scanning probe, and this ω value as a rotational speed command of the rotary table.

15. The measuring method of V-groove shape of claim 14, wherein the speed vector command Vt of said probe is sum of the speed vector Vz, and a displacement correction vector Ve for keeping constant the displacement of the scanning probe.

16. A measuring apparatus of V-groove shape comprising:
   a rotary table fixing an object to be measured forming a spiral V-groove,
   a scanning probe having a measuring element engaged with surface of the object,
   a drive mechanism for moving the scanning probe along the surface of the object,
   position detecting means for detecting position of the scanning probe, and
   control means for controlling moving speed of the scanning probe and rotating speed of the rotary table so that the measuring element may always contact with two flanks for composing the V-groove, wherein the control means performs a measuring element direction constant control aiming at keeping constant a vector projected on a table plane of the rotary table of a direction vector from the origin of the object to the measuring element of the scanning probe as seen from a machine coordinate system.

17. The measuring apparatus of V-groove shape of claim 16,
   wherein said control means is designed to control in combination of the measuring element direction constant control, a rotary table radius constant scanning control, and a two-flank contact control.

18. The measuring apparatus of V-groove shape of claim 16, wherein said control means is designed to control in combination of the two-flank contact control and a pitch scanning control.

19. The measuring apparatus of V-groove shape of claim 16, wherein plural measuring elements differing in diameter are disposed parallel to the scanning probe, so as to be selected according to size of the V-groove.

20. The measuring apparatus of V-groove shape of claim 16, wherein said rotary table is assembled into a three-dimensional measuring machine, and its coordinate measuring probe is used as the scanning probe.

21. The measuring apparatus of V-groove shape of claim 16, wherein a hole is drilled in center of rotation of the rotary table and/or in platen of the three-dimensional measuring machine immediately beneath it, for receiving lower end of a long object.

* * * * *